United States Patent

Okada et al.

(10) Patent No.: US 9,749,203 B2
(45) Date of Patent: Aug. 29, 2017

(54) PACKET ANALYSIS APPARATUS AND PACKET ANALYSIS METHOD

(71) Applicant: FUJITSU LIMITED, Kawasaki-shi, Kanagawa (JP)

(72) Inventors: Sumiyo Okada, Kawasaki (JP); Yuji Nomura, Kawasaki (JP); Fumiyuki Iizuka, Kawasaki (JP); Naoyoshi Ohkawa, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 213 days.

(21) Appl. No.: 14/672,367

(22) Filed: Mar. 30, 2015

(65) Prior Publication Data

US 2015/0281014 A1   Oct. 1, 2015

(30) Foreign Application Priority Data

Mar. 31, 2014   (JP) ................................. 2014-072660

(51) Int. Cl.
*H04L 12/26* (2006.01)
*H04L 12/24* (2006.01)
*H04L 12/801* (2013.01)

(52) U.S. Cl.
CPC .......... *H04L 43/067* (2013.01); *H04L 41/142* (2013.01); *H04L 43/0864* (2013.01); *H04L 41/0896* (2013.01); *H04L 47/127* (2013.01); *H04L 47/193* (2013.01)

(58) Field of Classification Search
CPC . H04L 43/067; H04L 43/0864; H04L 41/142; H04L 43/08; H04L 43/10; H04L 43/16; H04L 43/106; H04L 47/127; H04L 47/193; H04L 41/0896
See application file for complete search history.

(56) References Cited

U.S. PATENT DOCUMENTS

| | | | | |
|---|---|---|---|---|
| 8,379,535 | B2* | 2/2013 | Chen | H04L 12/5695 370/230 |
| 8,452,871 | B2* | 5/2013 | Ge | H04L 43/04 709/223 |
| 9,124,518 | B2* | 9/2015 | Isobe | H04L 1/1854 |
| 9,231,829 | B2* | 1/2016 | Isobe | H04L 69/16 |
| 2004/0165543 | A1 | 8/2004 | Nakazawa | |
| 2011/0267975 | A1 | 11/2011 | Tanaka et al. | |

(Continued)

FOREIGN PATENT DOCUMENTS

JP   2004-253934   9/2004
JP   2010-161616   7/2010

*Primary Examiner* — Brian O'Connor
(74) *Attorney, Agent, or Firm* — Fujitsu Patent Center

(57) ABSTRACT

A storage unit stores a plurality of packets collected in a wired section. An operation unit classifies the plurality of packets stored in the storage unit for each connection. The operation unit determines packets corresponding to a connection having a period in which a total data amount of packets for each of which a confirmation response packet has not arrived from a destination apparatus among packets transmitted by an information processing apparatus connected to the wired section increases when the connection is started, a round-trip time of each of the packets transmitted by the information processing apparatus not increasing monotonically in the period, to be packets of communication including the wireless section.

7 Claims, 18 Drawing Sheets

(56) References Cited

U.S. PATENT DOCUMENTS

| | | | | |
|---|---|---|---|---|
| 2013/0229916 A1* | 9/2013 | Isobe | ................... | H04L 1/1854 370/230 |
| 2013/0282896 A1* | 10/2013 | Ge | ......................... | H04L 43/04 709/224 |
| 2014/0355442 A1* | 12/2014 | Isobe | ..................... | H04L 69/16 370/235 |

* cited by examiner

FIG. 1
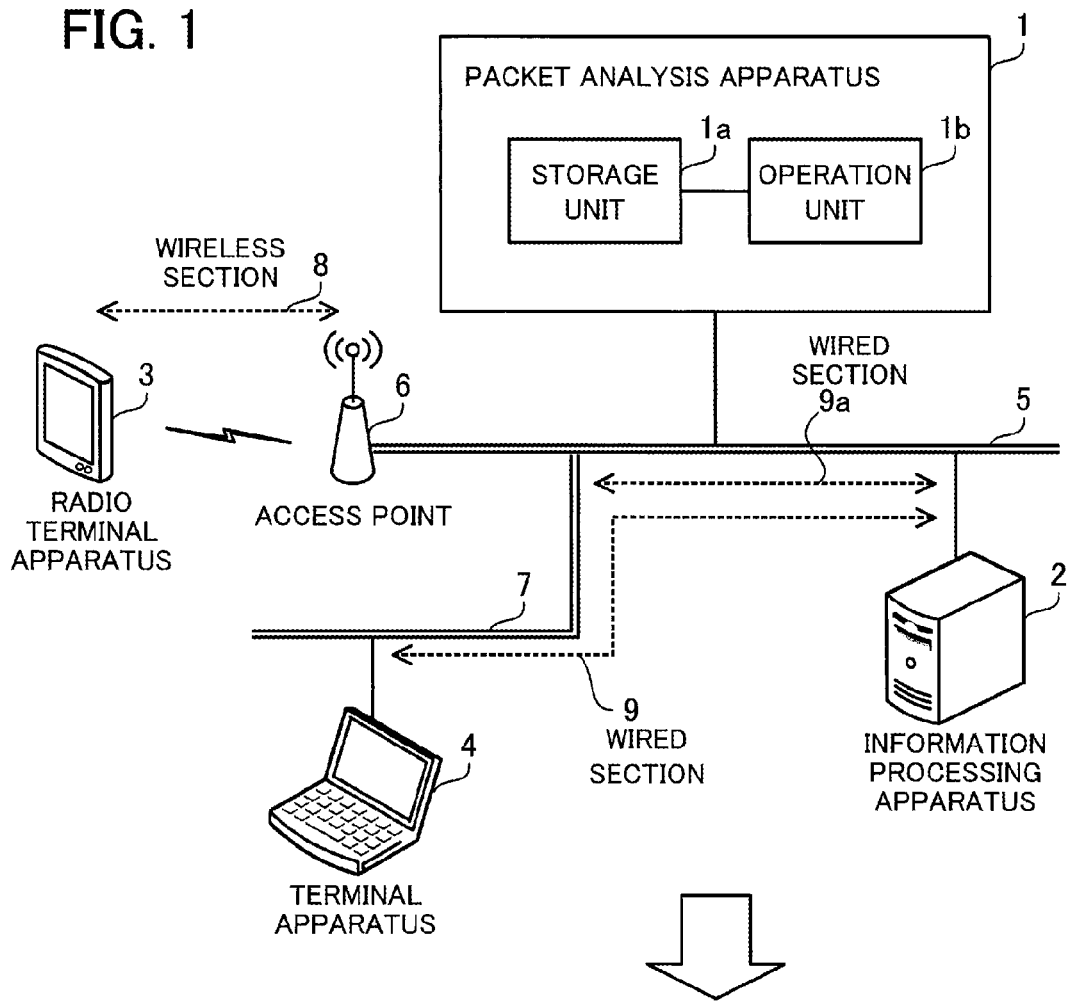
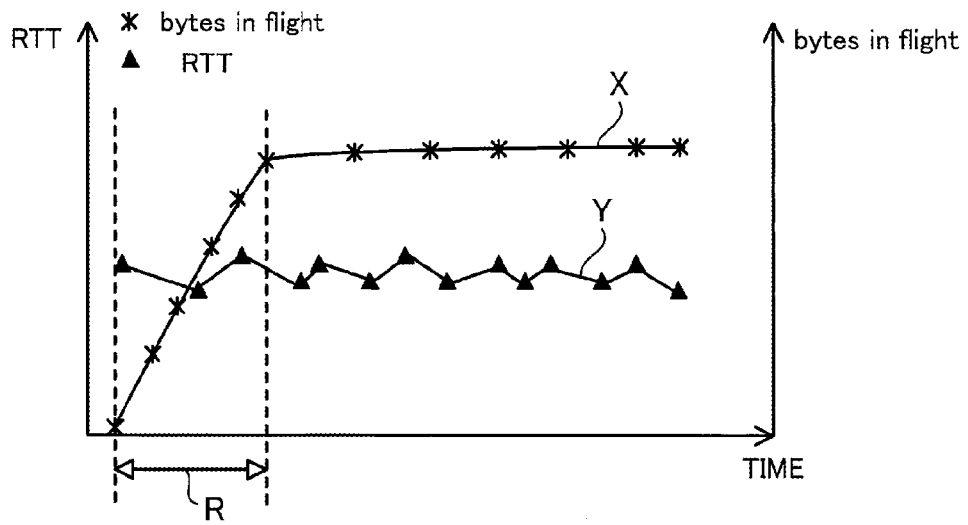

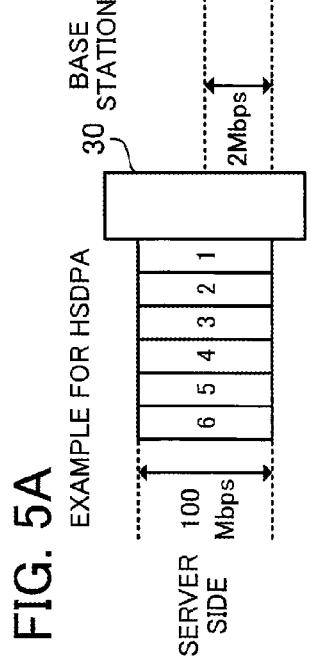
FIG. 5A EXAMPLE FOR HSDPA
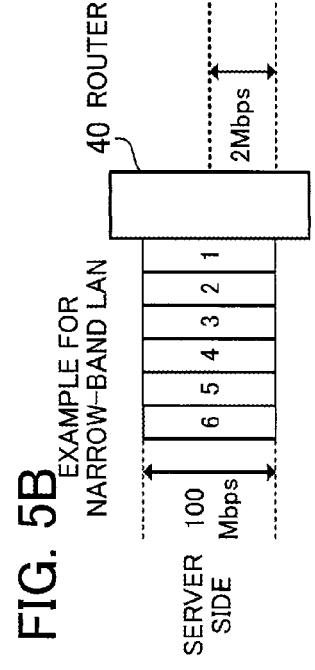
FIG. 5B EXAMPLE FOR NARROW-BAND LAN
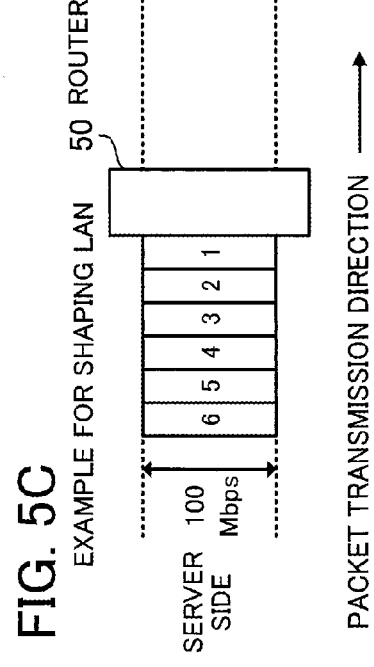
FIG. 5C EXAMPLE FOR SHAPING LAN
PACKET TRANSMISSION DIRECTION →

FIG. 6

PACKET TABLE (TYPICAL LAN) — 111

| No. | TIME | SA | SP | DA | DP | Protocol | TCP LEN | IP LEN | seq | next seq | ACK | RTT | bytes in flight |
|---|---|---|---|---|---|---|---|---|---|---|---|---|---|
| 1 | 15:52:05.486593 | IP1 | 40952 | IP2 | 60401 | TCP | 1448 | 1500 | 148725083 | 14876531 | 1633673393 | - | 2896 |
| 2 | 15:52:05.486631 | IP2 | 60401 | IP1 | 40952 | TCP | 0 | 52 | 1633673393 | - | 14876531 | 0.000038 | - |
| 3 | ... | ... | ... | ... | ... | ... | ... | ... | ... | ... | ... | ... | ... |
| 4 | 15:52:05.487749 | IP1 | 40952 | IP2 | 60401 | TCP | 1448 | 1500 | 148727979 | 148729427 | 1633673393 | - | 2896 |
| 5 | 15:52:05.487779 | IP2 | 60401 | IP1 | 40952 | TCP | 0 | 52 | 1633673393 | - | 148729427 | 0.000030 | - |
| 6 | ... | ... | ... | ... | ... | ... | ... | ... | ... | ... | ... | ... | ... |
| 7 | 15:52:05.488710 | IP1 | 40952 | IP2 | 60401 | TCP | 1448 | 1500 | 148730875 | 148732323 | 1633673393 | - | 2896 |
| 8 | 15:52:05.488912 | IP2 | 60401 | IP1 | 40952 | TCP | 0 | 52 | 1633673393 | - | 148732323 | 0.000041 | - |
| 9 | ... | ... | ... | ... | ... | ... | ... | ... | ... | ... | ... | ... | ... |
| 10 | 15:52:05.488988 | IP1 | 40952 | IP2 | 60401 | TCP | 1448 | 1500 | 148733771 | 148735219 | 1633673393 | - | 2896 |
| 11 | 15:52:05.489009 | IP2 | 60401 | IP1 | 40952 | TCP | 0 | 52 | 1633673393 | - | 148735219 | 0.000021 | - |
| 12 | ... | ... | ... | ... | ... | ... | ... | ... | ... | ... | ... | ... | ... |
| 13 | 15:52:05.490130 | IP1 | 40952 | IP2 | 60401 | TCP | 1448 | 1500 | 148736667 | 148738115 | 1633673393 | - | 2896 |
| 14 | 15:52:05.490231 | IP2 | 60401 | IP1 | 40952 | TCP | 0 | 52 | 1633673393 | - | 148738115 | 0.000101 | - |
| 15 | ... | ... | ... | ... | ... | ... | ... | ... | ... | ... | ... | ... | ... |
| 16 | 15:52:05.490273 | IP1 | 40952 | IP2 | 60401 | TCP | 1448 | 1500 | 148739563 | 148741011 | 1633673393 | - | 2896 |
| 17 | 15:52:05.490336 | IP2 | 60401 | IP1 | 40952 | TCP | 0 | 52 | 1633673393 | - | 148741011 | 0.000063 | - |
| 18 | ... | ... | ... | ... | ... | ... | ... | ... | ... | ... | ... | ... | ... |
| 19 | 15:52:05.490443 | IP1 | 40952 | IP2 | 60401 | TCP | 1448 | 1500 | 148742459 | 148743907 | 1633673393 | - | 2896 |
| 20 | 15:52:05.490488 | IP2 | 60401 | IP1 | 40952 | TCP | 0 | 52 | 1633673393 | - | 148743907 | 0.000045 | - |
| 21 | ... | ... | ... | ... | ... | ... | ... | ... | ... | ... | ... | ... | ... |
| 22 | 15:52:05.491377 | IP1 | 40952 | IP2 | 60401 | TCP | 1448 | 1500 | 148745355 | 148746803 | 1633673393 | - | 2896 |
| 23 | 15:52:05.491452 | IP2 | 60401 | IP1 | 40952 | TCP | 0 | 52 | 1633673393 | - | 148746803 | 0.000075 | - |
| ... | ... | ... | ... | ... | ... | ... | ... | ... | ... | ... | ... | ... | ... |

TYPICAL LAN

FIG. 8

PACKET TABLE (HSDPA) 112

| No. | TIME | SA | SP | DA | DP | Protocol | TCP LEN | IP LEN | seq | next seq | ACK | RTT | bytes in flight |
|---|---|---|---|---|---|---|---|---|---|---|---|---|---|
| 1 | 04:13:20.611142 | IP1 | 80 | IP3 | 60628 | TCP | 1460 | 1500 | 460818496 | 460819956 | 2093475548 | - | 7300 |
| 2 | 04:13:20.611242 | IP1 | 80 | IP3 | 60628 | TCP | 1460 | 1500 | 460819956 | 460821416 | 2093475548 | - | 8760 |
| ... | ... | ... | ... | ... | ... | ... | ... | ... | ... | ... | ... | ... | ... |
| 4 | 04:13:20.700990 | IP1 | 80 | IP3 | 60628 | TCP | 1460 | 1500 | 460821416 | 460822876 | 2093475548 | - | 8760 |
| 5 | 04:13:20.701090 | IP1 | 80 | IP3 | 60628 | TCP | 1460 | 1500 | 460822876 | 460824336 | 2093475548 | - | 10220 |
| ... | ... | ... | ... | ... | ... | ... | ... | ... | ... | ... | ... | ... | ... |
| 8 | 04:13:20.710973 | IP1 | 80 | IP3 | 60628 | TCP | 1460 | 1500 | 460824336 | 460825796 | 2093475548 | - | 8760 |
| 9 | 04:13:20.711123 | IP1 | 80 | IP3 | 60628 | TCP | 1460 | 1500 | 460825796 | 460827256 | 2093475548 | - | 10220 |
| 10 | 04:13:20.711223 | IP1 | 80 | IP3 | 60628 | TCP | 1460 | 1500 | 460827256 | 460828716 | 2093475548 | - | 11680 |
| ... | ... | ... | ... | ... | ... | ... | ... | ... | ... | ... | ... | ... | ... |
| 15 | 04:13:20.760740 | IP3 | 60628 | IP1 | 80 | TCP | 0 | 40 | 2093475548 | - | 460819956 | 0.149598 | - |
| ... | ... | ... | ... | ... | ... | ... | ... | ... | ... | ... | ... | ... | ... |
| 18 | 04:13:20.770573 | IP3 | 60628 | IP1 | 80 | TCP | 0 | 40 | 2093475548 | - | 460821416 | 0.159331 | - |
| ... | ... | ... | ... | ... | ... | ... | ... | ... | ... | ... | ... | ... | ... |
| 21 | 04:13:20.840455 | IP3 | 60628 | IP1 | 80 | TCP | 0 | 40 | 2093475548 | - | 460822876 | 0.139465 | - |
| ... | ... | ... | ... | ... | ... | ... | ... | ... | ... | ... | ... | ... | ... |
| 24 | 04:13:20.850588 | IP3 | 60628 | IP1 | 80 | TCP | 0 | 40 | 2093475548 | - | 460824336 | 0.149498 | - |
| ... | ... | ... | ... | ... | ... | ... | ... | ... | ... | ... | ... | ... | ... |
| 27 | 04:13:20.860571 | IP3 | 60628 | IP1 | 80 | TCP | 0 | 40 | 2093475548 | - | 460825796 | 0.149598 | - |
| 28 | 04:13:20.860620 | IP3 | 60628 | IP1 | 80 | TCP | 0 | 40 | 2093475548 | - | 460827256 | 0.149497 | - |
| ... | ... | ... | ... | ... | ... | ... | ... | ... | ... | ... | ... | ... | ... |
| 33 | 04:13:20.870554 | IP3 | 60628 | IP1 | 80 | TCP | 0 | 40 | 2093475548 | - | 460828716 | 0.159331 | - |
| ... | ... | ... | ... | ... | ... | ... | ... | ... | ... | ... | ... | ... | ... |

HSDPA

FIG. 10

PACKET TABLE (NARROW BANDWIDTH LAN) 113

| No. | TIME | SA | SP | DA | DP | Protocol | TCP LEN | IP LEN | seq | next seq | ACK | RTT | bytes in flight |
|---|---|---|---|---|---|---|---|---|---|---|---|---|---|
| 1 | 15:53:16.132608 | IP1 | 27525 | IP4 | 45390 | TCP | 1448 | 1500 | 2492693045 | 2492694493 | 1886416639 | - | 1448 |
| 2 | 15:53:16.132716 | IP1 | 27525 | IP4 | 45390 | TCP | 1448 | 1500 | 2492694493 | 2492695941 | 1886416639 | - | 2896 |
| 3 | 15:53:16.132832 | IP1 | 27525 | IP4 | 45390 | TCP | 1448 | 1500 | 2492695941 | 2492697389 | 1886416639 | - | 4344 |
| 4 | 15:53:16.132961 | IP1 | 27525 | IP4 | 45390 | TCP | 1448 | 1500 | 2492697389 | 2492698837 | 1886416639 | - | 5702 |
| 5 | 15:53:16.133069 | IP1 | 27525 | IP4 | 45390 | TCP | 1448 | 1500 | 2492698837 | 2492700285 | 1886416639 | - | 7240 |
| 6 | 15:53:16.133191 | IP1 | 27525 | IP4 | 45390 | TCP | 1448 | 1500 | 2492700285 | 2492701733 | 1886416639 | - | 8688 |
| 7 | 15:53:16.133323 | IP1 | 27525 | IP4 | 45390 | TCP | 1448 | 1500 | 2492701733 | 2492703181 | 1886416639 | - | 10136 |
| 8 | 15:53:16.133434 | IP1 | 27525 | IP4 | 45390 | TCP | 1448 | 1500 | 2492703181 | 2492704629 | 1886416639 | - | 11584 |
| 9 | 15:53:16.133438 | IP4 | 45390 | IP1 | 27525 | TCP | 0 | 52 | 1886416639 | - | 2492694493 | 0.000830 | - |
| ... | ... | ... | ... | ... | ... | ... | ... | ... | ... | ... | ... | ... | ... |
| 14 | 15:53:16.134050 | IP4 | 45390 | IP1 | 27525 | TCP | 0 | 52 | 1886416639 | - | 2492695941 | 0.001334 | - |
| 15 | 15:53:16.135299 | IP4 | 45390 | IP1 | 27525 | TCP | 0 | 52 | 1886416639 | - | 2492697389 | 0.002467 | - |
| 16 | 15:53:16.136588 | IP4 | 45390 | IP1 | 27525 | TCP | 0 | 52 | 1886416639 | - | 2492698837 | 0.003627 | - |
| ... | ... | ... | ... | ... | ... | ... | ... | ... | ... | ... | ... | ... | ... |
| 23 | 15:53:16.137842 | IP4 | 45390 | IP1 | 27525 | TCP | 0 | 52 | 1886416639 | - | 2492700285 | 0.004773 | - |
| 24 | 15:53:16.139086 | IP4 | 45390 | IP1 | 27525 | TCP | 0 | 52 | 1886416639 | - | 2492701733 | 0.005895 | - |
| 25 | 15:53:16.140321 | IP4 | 45390 | IP1 | 27525 | TCP | 0 | 52 | 1886416639 | - | 2492703181 | 0.006988 | - |
| ... | ... | ... | ... | ... | ... | ... | ... | ... | ... | ... | ... | ... | ... |
| 32 | 15:53:16.141321 | IP4 | 45390 | IP1 | 27525 | TCP | 0 | 52 | 1886416639 | - | 2492704629 | 0.007877 | - |
| ... | ... | ... | ... | ... | ... | ... | ... | ... | ... | ... | ... | ... | ... |

NARROW-BAND LAN

FIG. 12

PACKET TABLE (SHAPING LAN) 114

| No. | TIME | SA | SP | DA | DP | Protocol | TCP LEN | IP LEN | seq | next seq | ACK | RTT | bytes in flight |
|---|---|---|---|---|---|---|---|---|---|---|---|---|---|
| 1 | 14:30:35.236636 | IP1 | 80 | IP5 | 53625 | HTTP | 1460 | 1500 | 664729235 | 664730695 | 1555774022 | - | 2920 |
| 2 | 14:30:35.236640 | IP1 | 80 | IP5 | 53625 | HTTP | 1460 | 1500 | 664730695 | 664732155 | 1555774022 | - | 4380 |
| 3 | 14:30:35.236677 | IP1 | 80 | IP5 | 53625 | HTTP | 1460 | 1500 | 664732155 | 664733615 | 1555774022 | - | 5840 |
| 4 | 14:30:35.236681 | IP1 | 80 | IP5 | 53625 | HTTP | 1460 | 1500 | 664733615 | 664735075 | 1555774022 | - | 7300 |
| ... | ... | ... | ... | ... | ... | ... | ... | ... | ... | ... | ... | ... | ... |
| 39 | 14:30:35.242435 | IP5 | 53625 | IP1 | 80 | TCP | 0 | 40 | 1555774022 | - | 664730695 | 0.005799 | - |
| 40 | 14:30:35.244775 | IP5 | 53625 | IP1 | 80 | TCP | 0 | 40 | 1555774022 | - | 664732155 | 0.008098 | - |
| 41 | 14:30:35.247277 | IP5 | 53625 | IP1 | 80 | TCP | 0 | 40 | 1555774022 | - | 664733615 | 0.010592 | - |
| 42 | 14:30:35.249822 | IP5 | 53625 | IP1 | 80 | TCP | 0 | 40 | 1555774022 | - | 664735075 | 0.013089 | - |
| ... | ... | ... | ... | ... | ... | ... | ... | ... | ... | ... | ... | ... | ... |
| 99 | 14:30:35.302626 | IP1 | 80 | IP8 | 53625 | HTTP | 1460 | 1500 | 664808781 | 664810241 | 1555774022 | - | 8760 |
| 100 | ... | ... | ... | ... | ... | ... | ... | ... | ... | ... | ... | ... | ... |
| 101 | 14:30:35.302675 | IP1 | 80 | IP8 | 53625 | HTTP | 1460 | 1500 | 664811701 | 664813161 | 1555774022 | - | 11680 |
| 102 | 14:30:35.302681 | IP1 | 80 | IP8 | 53625 | HTTP | 1460 | 1500 | 664813161 | 664814621 | 1555774022 | - | 13140 |
| 103 | ... | ... | ... | ... | ... | ... | ... | ... | ... | ... | ... | ... | ... |
| 104 | 14:30:35.302731 | IP1 | 80 | IP8 | 53625 | HTTP | 1460 | 1500 | 664816081 | 664817541 | 1555774022 | - | 16060 |
| ... | ... | ... | ... | ... | ... | ... | ... | ... | ... | ... | ... | ... | ... |
| 134 | 14:30:35.315167 | IP5 | 53625 | IP1 | 80 | TCP | 0 | 40 | 1555774022 | - | 664810241 | 0.012541 | - |
| ... | ... | ... | ... | ... | ... | ... | ... | ... | ... | ... | ... | ... | ... |
| 137 | 14:30:35.327104 | IP5 | 53625 | IP1 | 80 | TCP | 0 | 40 | 1555774022 | - | 664813161 | 0.024429 | - |
| 138 | 14:30:35.333737 | IP5 | 53625 | IP1 | 80 | TCP | 0 | 40 | 1555774022 | - | 664814621 | 0.031056 | - |
| 139 | 14:30:35.344820 | IP5 | 53625 | IP1 | 80 | TCP | 0 | 40 | 1555774022 | - | 664817541 | 0.042089 | - |
| ... | ... | ... | ... | ... | ... | ... | ... | ... | ... | ... | ... | ... | ... |

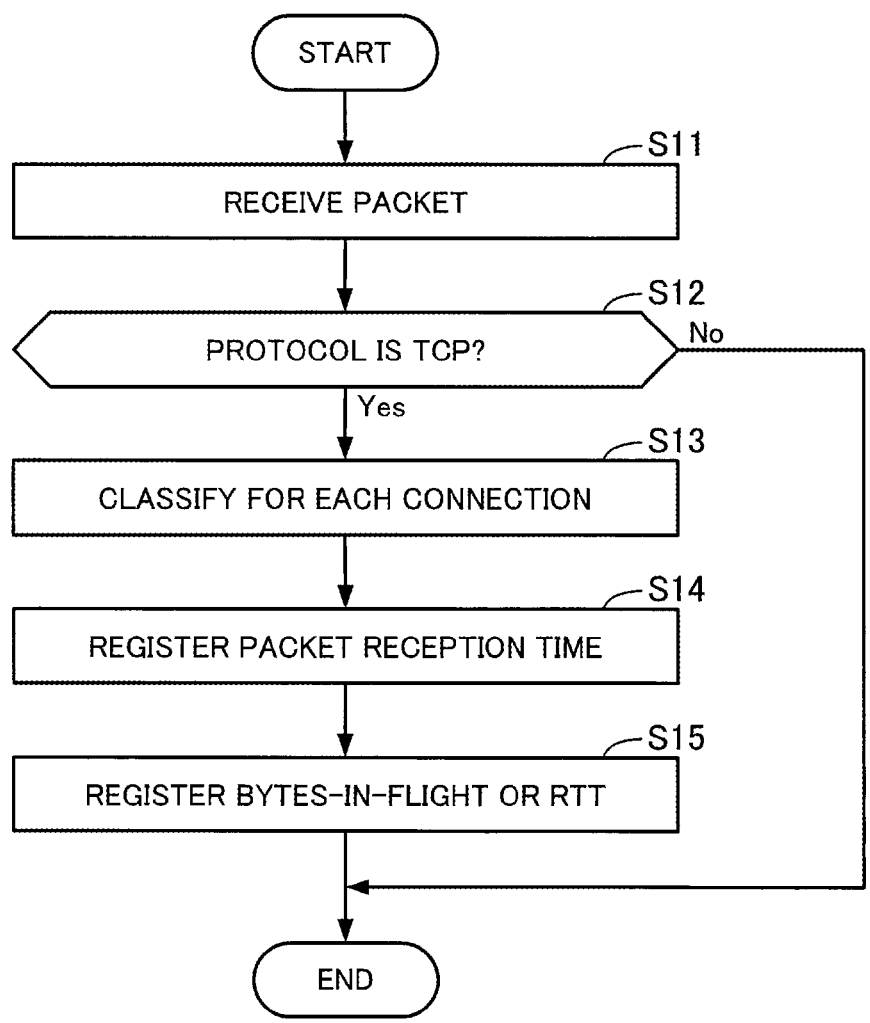

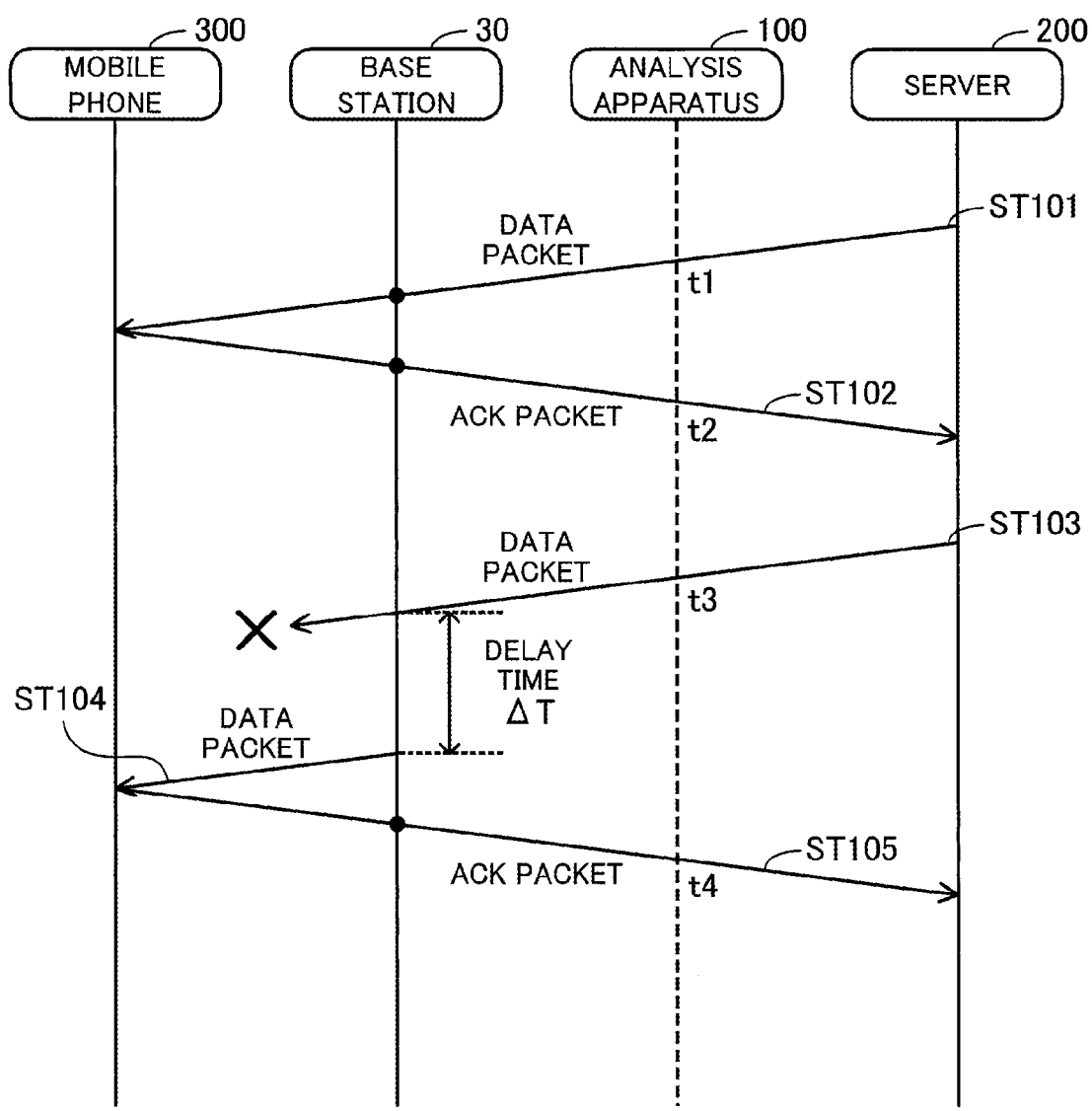

PACKET ANALYSIS APPARATUS AND PACKET ANALYSIS METHOD

CROSS-REFERENCE TO RELATED APPLICATION

This application is based upon and claims the benefit of priority of the prior Japanese Patent Application No. 2014-072660, filed on Mar. 31, 2014, the entire contents of which are incorporated herein by reference.

FIELD

The embodiments discussed herein relate to a packet analysis apparatus and a packet analysis method.

BACKGROUND

Currently, a plurality of information processing apparatuses such as computers are connected to a network and data communication is performed between the apparatuses via the network. The communication path of the network may include a wired section transmitting a signal by wire and a wireless section transmitting a signal by radio. Further, TCP/IP (Transmission Control Protocol/Internet Protocol) is employed as a protocol for transmitting data on the network. Transmission and reception of packetized data are performed widely using TCP/IP.

Meanwhile, a situation of the data communication in the network is sometimes analyzed in order to improve data communication setting or the like. For example, there has been a proposal to measure a packet round-trip time in a communication path including a radio communication section, estimate a communication speed from the maximum value and the minimum value of variation in the round-trip time, and calculate a re-transmission timeout time adapted for a transmission data length based on the estimated value.

Further, when a communication apparatus communicates with an opposite apparatus via a relay apparatus, there is also a proposal to switch the communication with the opposite apparatus from the indirect radio communication via the relay apparatus to direct radio communication without passing through the relay apparatus, if the communication section between the relay apparatus and the opposite apparatus is determined to be a radio connection. In this proposal, the relay apparatus and the opposite apparatus are determined to be connected by radio when the communication apparatus and the relay apparatus are connected by radio and the communication time between the relay apparatus and the opposite apparatus is longer than the communication time between the communication apparatus and the relay apparatus.

Japanese Laid-Open Patent Publication No. 2004-253934
Japanese Laid-Open Patent Publication No. 2010-161616

The data communication situation is sometimes analyzed in a system in which a server apparatus provides service to a plurality of client terminals. In particular, analyzing communication delay in a wireless section of the communication including the wireless section in the communication path may lead to improvement of a communication quality and the like for a radio terminal.

Here, comparatively many wireless sections exist within the network in a user-side network end section (downstream side) connecting a client terminal and a radio access point, for example. Accordingly, when a packet collection apparatus is installed in each of the wireless sections, the number of collection points is increased and the number of the apparatuses to be installed is also increased. Therefore, it is conceivable to collect packets in the wired section to which the server apparatus is connected (upstream side). This is because it is possible to effectively collect packets transmitted and received between the server apparatus and the plurality of client terminals with a smaller number of collection points than on the downstream side.

In this case, the packets to be collected are not limited to just the packets of the communication including the wireless section in the communication path. For example, when the server apparatus provides services for many and unspecified client terminals, the packets to be collected may include also packets of the communication not including a wireless section in the communication path between the server apparatus and the client terminal. Accordingly, it becomes a problem how to select the packets of the communication including the wireless section from the collected packets.

SUMMARY

According to an aspect, there is provided a non-transitory computer-readable storage medium storing a computer program that causes a computer to perform a process including: collecting packets of communication including a wireless section and a wired section, in the wired section, and classifying the packets for each connection; and determining packets corresponding to a connection having a period in which a total data amount of packets for each of which a confirmation response packet has not arrived from a destination apparatus among packets transmitted by an information processing apparatus connected to the wired section increases when the connection is started, a round-trip time of each of the packets transmitted by the information processing apparatus not increasing monotonically in the period, to be packets of communication including the wireless section.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 illustrates an information processing system in a first embodiment;

FIGS. 5A to 5C illustrate packet transmission examples for each line type;

FIG. 6 illustrates a packet table example for a typical LAN;

FIG. 8 illustrates a packet table example for HSDPA;

FIG. 10 illustrates a packet table example for a narrow-band LAN;

FIG. 12 illustrates a packet table example for a shaping LAN.

FIG. 14 is a flowchart illustrating an example of processing of classifying packets;

FIG. 16 illustrates an example of a determination method of a radio channel type;

DESCRIPTION OF EMBODIMENTS

Figure 2:
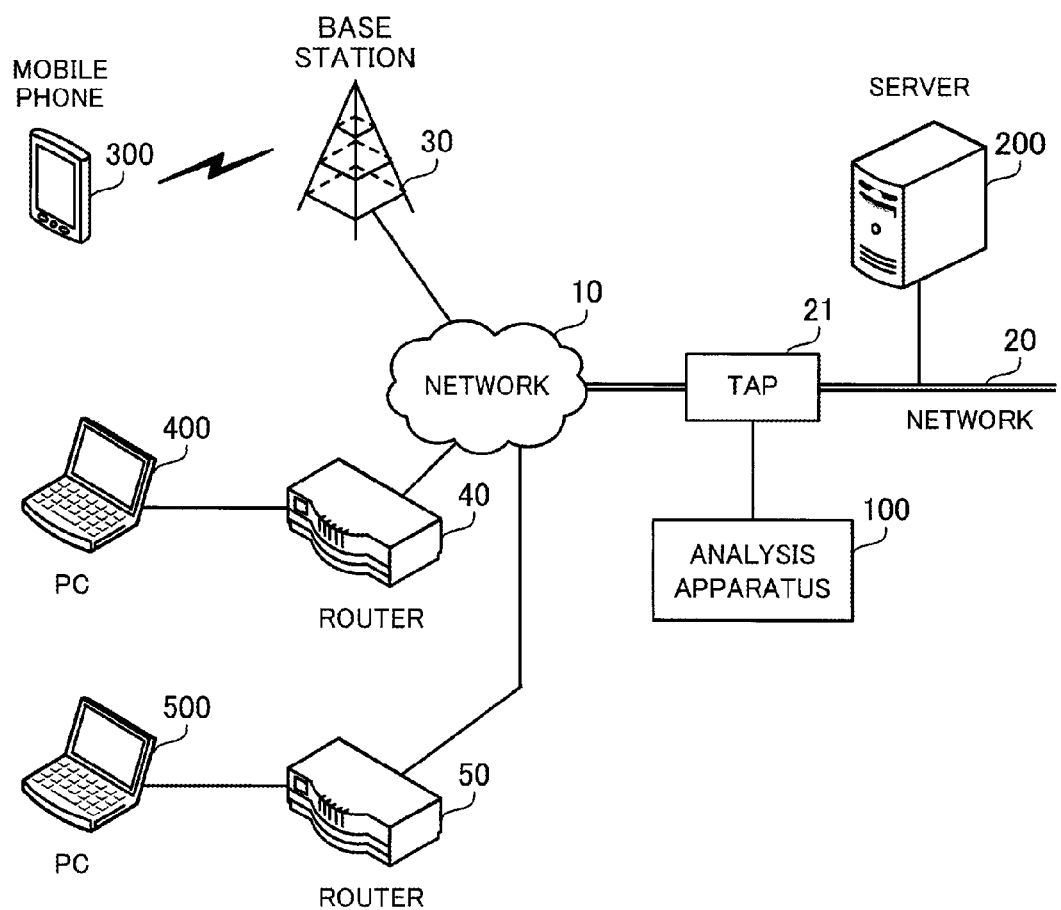
FIG. 2 illustrates an information processing system in a second embodiment.

Several embodiments will be described below with reference to the accompanying drawings, wherein like reference numerals refer to like elements throughout.

[First Embodiment]

FIG. 1 illustrates an information processing system in a first embodiment. The information processing system of the first embodiment includes a packet analysis apparatus 1, an information processing apparatus 2, a radio terminal apparatus 3, and a terminal apparatus 4. The packet analysis apparatus 1 collects and analyzes packets transmitted and received by the information processing apparatus 2. The information processing apparatus 2 is an apparatus (e.g., server computer) providing predetermined service to the radio terminal apparatus 3 and the terminal apparatus 4. Each of the radio terminal apparatus 3 and the terminal apparatus 4 is a terminal apparatus used by a user (e.g., client computer, mobile phone, tablet terminal, etc.). TCP/IP is used for communication between the apparatuses.

The packet analysis apparatus 1 and the information processing apparatus 2 are connected to a wired network 5 by wire. The wired network 5 does not include a wireless section. The wired network 5 is connected with a radio communication access point 6 (e.g., radio base station). The radio terminal apparatus 3 communicates with the information processing apparatus 2 via the access point 6 and the wired network 5. Radio communication between the radio terminal apparatus 3 and the access point 6 is performed in a wireless section 8.

The wired network 5 is connected to a wired network 7. The wired network 7 does not include a wireless section. The terminal apparatus 4 is connected to the wired network 7 by wire. The terminal apparatus 4 communicates with the information processing apparatus 2 via the wired networks 7 and 5.

A wired section 9 belongs to the wired networks 5 and 7 among communication paths between the information processing apparatus 2 and the terminal apparatus 4. The wired section 9 does not include any wireless section. A wired section 9a belongs to the wired network 5 among the communication paths between the information processing apparatus 2 and the terminal apparatus 4. The section between the information processing apparatus 2 and the access point 6 is also a wired section (including the wired section 9a).

The packet analysis apparatus 1 is connected to the wired section 9a. The packet analysis apparatus 1 collects packets transmitted and received via the wired section 9a. For example, it is conceivable to receive and collect packets copied by a tap or a switch connecting the wired section 9a and the packet analysis apparatus 1, in the packet analysis apparatus 1. Information of collection time is attached to each collected packet. Further, packets of communication between the information processing apparatus 2 and the radio terminal apparatus 3 (communication including the wireless section 8) and packets of communication between the information processing apparatus 2 and the terminal apparatus 4 (communication not including the wireless section 8) are mixed in the collected packets.

The packet analysis apparatus 1 includes a storage unit 1a and an operation unit 1b. The storage unit 1a may be a volatile storage apparatus such as RAM (Random Access Memory), and may be a nonvolatile storage apparatus such as HDD (Hard Disk Drive) and a flash memory. The storage unit 1a stores the collected packets.

The operation unit 1b may include CPU (Central Processing Unit), DSP (Digital Signal Processor), ASIC (Application Specific Integrated Circuit), FPGA (Field Programmable Gate Array), or the like. The operation unit 1b may be a processor executing a program. The "processor" may also include a set of a plurality of processors (multi-processor).

The operation unit 1b classifies the plurality of collected packets for each connection. For example, the operation unit 1b may perform packet classification for each connection according to a combination of a source IP address and a destination IP address included in an IP header of the packet and a combination of a source port number and a destination port number in a TCP header. That is, the operation unit 1b classifies the packets having the common source/destination port number (including destination/source port number) among the packets having the common source/destination IP address (including destination/source IP address), into the same connection. The operation unit 1b performs the following analysis according to information of each packet classified for each of the connections and the packet collection time.

The operation unit 1b determines for each connection whether or not there exists a period in which a total data amount of packets for each of which a confirmation response packet has not arrived among the packets transmitted by the information processing apparatus 2 increases when the connection is started. The confirmation response packet is sometimes called an ACK (ACKnowledgement) packet or called simply ACK. Further, the total data amount of the packets for each of which the confirmation response packet has not arrived among the packets transmitted by the information processing apparatus 2 is sometimes called bytes-in-flight. That is, the operation unit 1b determines, for each connection, whether or not there exists a period in which the bytes-in-flight increases (bytes-in-flight increase period) when the connection is started. Existence of the bytes-in-flight increase period means that communication delay occurs in relation to the corresponding connection.

For the connection having the bytes-in-flight increase period, the operation unit 1b determines whether or not a round-trip time (RTT) of the packet transmitted by the information processing apparatus 2 increases monotonically in the corresponding bytes-in-flight increase period. RTT is a time since a predetermined data packet is transmitted by the information processing apparatus 2 until a confirmation response packet for the data packet arrives at the information processing apparatus 2. For example, RTT may be measured in the packet analysis apparatus 1 as a time interval between a time point when the data packet transmitted by the information processing apparatus 2 is collected and a time point when ACK corresponding to the data packet is collected. Then, the operation unit 1b determines that the packet corresponding to the connection in which RTT does not increase monotonically in the bytes-in-flight increase period is the packet of the communication including the wireless section 8.

FIG. 1 illustrates also a graph illustrating an analysis result of the packet in a connection. Series X indicates a relationship of time and the bytes-in-flight. Series Y indicates a relationship of time and RTT. Focusing on series X, the bytes-in-flight increases in a period R when the connection is started. Accordingly, the period R is the bytes-in-flight increase period. Further, focusing on series Y, RTT does not increase monotonically in the period R. Accordingly, the operation unit 1b determines the packets of the connection corresponding to this graph to be the packets of the communication including the wireless section 8.

According to the packet analysis apparatus 1, the packets of the communication including the wired section 9a and including the wireless section 8 and the packets of the communication including the wired section 9a and not including the wireless section 8 are mixed, and the plurality of packets collected in the wired section 9a is classified for each connection. The packet analysis apparatus 1 determines the packets corresponding to the connection in which the bytes-in-flight increase period R exists when the connection is started and also RTT of the packet transmitted by the information processing apparatus 2 does not increase monotonically in this period R, to be the packets of the communication including the wireless section 8. Thereby, it is possible to specify the packets of the communication including the wireless section 8.

Here, when communication delay occurs between the information processing apparatus 2 and the radio terminal apparatus 3, it is sometimes desired to specify whether the communication delay is caused by the wireless section 8. This is because specifying the cause may lead to improvement of communication quality of the wireless section 8. As a method of specifying whether the communication delay is caused by the wireless section 8, it is conceivable to examine whether packet re-transmission occurs in a predetermined period complying with a communication standard of the wireless section 8, for example, for the connection having the bytes-in-flight increase period.

The information processing apparatus 2, however, may communicate with many and unspecified terminal apparatuses. Accordingly, when the packets are collected in the wired section 9a, the packets related to the communication of the information processing apparatus 2 are collected effectively, but, on the other hand, also the packets of the communication not including the wireless section 8 are mixed and collected together. In an example of the first embodiment, both of the packets of the communication between the information processing apparatus 2 and the radio terminal apparatus 3 via the wireless section 8 and the packets of the communication between the information processing apparatus 2 and the terminal apparatus 4 via the wired section 9 are collected.

In this case, when, focusing on a feature of re-transmission control in the communication standard, the communication delay caused by the wireless section 8 is to be detected by making use of only periodicity of the packet re-transmission, there arises a problem that the packets of the communication including the wireless section 8 is determined erroneously to be the packets of the communication not including the wireless section 8. This is because, also in the wired networks 5 and 7, delay according to transfer control (e.g., shaping) of a relay apparatus or the like performing data transfer is sometimes closely similar to the delay caused by the re-transmission in the wireless section 8.

Accordingly, the packet analysis apparatus 1 determines the packets corresponding to the connection in which RTT does not increase monotonically in the bytes-in-flight increase period to be the packets of the communication including the wireless section 8. Thereby, the packet analysis apparatus 1 selects the packets of the communication including the wireless section 8 from among the packets collected in the wired section 9a.

The above determination for RTT is based on the features of communication processing in the wireless section 8 and the wired section. When the communication delay is caused mainly by the communication processing in the wireless section 8, there is a high possibility that packet loss occurs by the influence of radio wave interference in the wireless section 8. When the packet loss occurs, the access point 6 re-transmits the lost packet in a certain period. The access point 6 repeats the re-transmission when the packet loss occurs in the re-transmission. The radio terminal apparatus 3, on receiving the packet, transmits ACK addressed to the information processing apparatus 2.

In this case, the packets transmitted sequentially from the information processing apparatus 2 to the radio terminal apparatus 3 arrive at the radio terminal apparatus 3 without re-transmission by the access point 6, or arrive at the radio terminal apparatus 3 after having been re-transmitted one or more times by the access point 6. The wireless section 8 has a lower stability of transmission path than the wired section. Accordingly, the existence or non-existence of the re-transmission and the number of re-transmissions may fluctuate randomly in the wireless section 8. That is, the time until each packet arrives at the radio terminal apparatus 3 may also fluctuate randomly. Then, the timing of ACK response by the radio terminal apparatus 3 varies in various ways as comparatively quick or delayed, and RTT will fluctuate randomly.

Meanwhile, in the case of the communication not including the wireless section 8 (e.g., communication through the wired section 9), RTT tends to increase monotonically along with the increase of the bytes-in-flight. This is because, in the wired section, the communication is unlikely to receive the influence of random factors in the transmission path in comparison with the wireless section, and a main delay factor may be considered to be the control by a router such as shaping and serialization in the relay apparatus which transfers data. That is, as the packet stays longer in the relay apparatus, the time until the packet arrives at the destination apparatus becomes longer and the ACK response by the destination apparatus is also delayed. As a result, RTT will increase monotonically.

From the reason as described above, the packet analysis apparatus 1 may associate the connection in which RTT does not increase monotonically in the bytes-in-flight increase period with the communication including the wireless section 8, and may specify the packets of the communication including the wireless section 8 appropriately from among the collected packets.

[Second Embodiment]

FIG. 2 illustrates an information processing system in a second embodiment. The information processing system in the second embodiment includes an analysis apparatus 100, a server 200, a mobile phone 300, and PCs (Personal Computers) 400 and 500. The server 200 is able to communicate with the mobile phone 300 and the PCs 400 and 500 via a network 10. The network 10 is a wide area network such as WAN (Wide Area Network) and the Internet, for example.

The network 10 is connected to a network 20. The server 200 is connected to the network 20. The network 20 is provided with a tap 21. The tap 21 is connected to the analysis apparatus 100. The tap 21 relays a packet, and also copies the packet to be relayed and transmits the copied packet to the analysis apparatus 100. Instead of the tap 21, a switch may be used which includes a function of copying a packet passing through a preliminarily set port and outputting the copied packet also from another port (port connected to the analysis apparatus 100) (sometimes called a port mirroring function).

The network 10 is connected to a base station and routers 40 and 50. The base station 30 relays communication between the server 200 and the mobile phone 300. Communication between the base station 30 and the mobile phone 300 uses HSDPA (High-Speed Downlink Packet Access), LTE (Long Term Evolution), or the like. The router 40 relays communication between the server 200 and PC 400. The router 50 relays communication between the server 200 and PC 500. The section between the base station 30 and mobile phone 300 is a wireless section. The sections between the other apparatuses are wired sections by Ethernet (registered trade mark). In the information processing system of the second embodiment, sometimes the side closer to the server 200 is called an upstream side, and the side closer to the mobile phone 300 or PCs 400 and 500 is called a downstream side.

The analysis apparatus 100 is a computer storing and analyzing the packets received from the tap 21. The server 200 is a server computer providing predetermined service for the mobile phone 300 and PCs 400 and 500. The mobile phone 300 is a radio terminal apparatus used by a user. Each of PCs 400 and 500 is a client computer and a terminal apparatus used by a user.

The analysis apparatus 100 analyzes packets transmitted and received between the server 200 and mobile phone 300 and packets transmitted and received between the server 200 and PCs 400 and 500. Then, the analysis apparatus 100 identifies what type of line is used by each of the terminal apparatuses for the communication at the end on the downstream side. Radio or wire is possible as the line type. Moreover, the radio type may be further divided into HSDPA and LTE, and the wire type may be further divided into a (narrow-band LAN (Local Area Network)) in which a comparatively narrow bandwidth is used on the downstream side and a (shaping LAN) in which shaping is performed in data transfer to the downstream side, for example.

Figure 3:
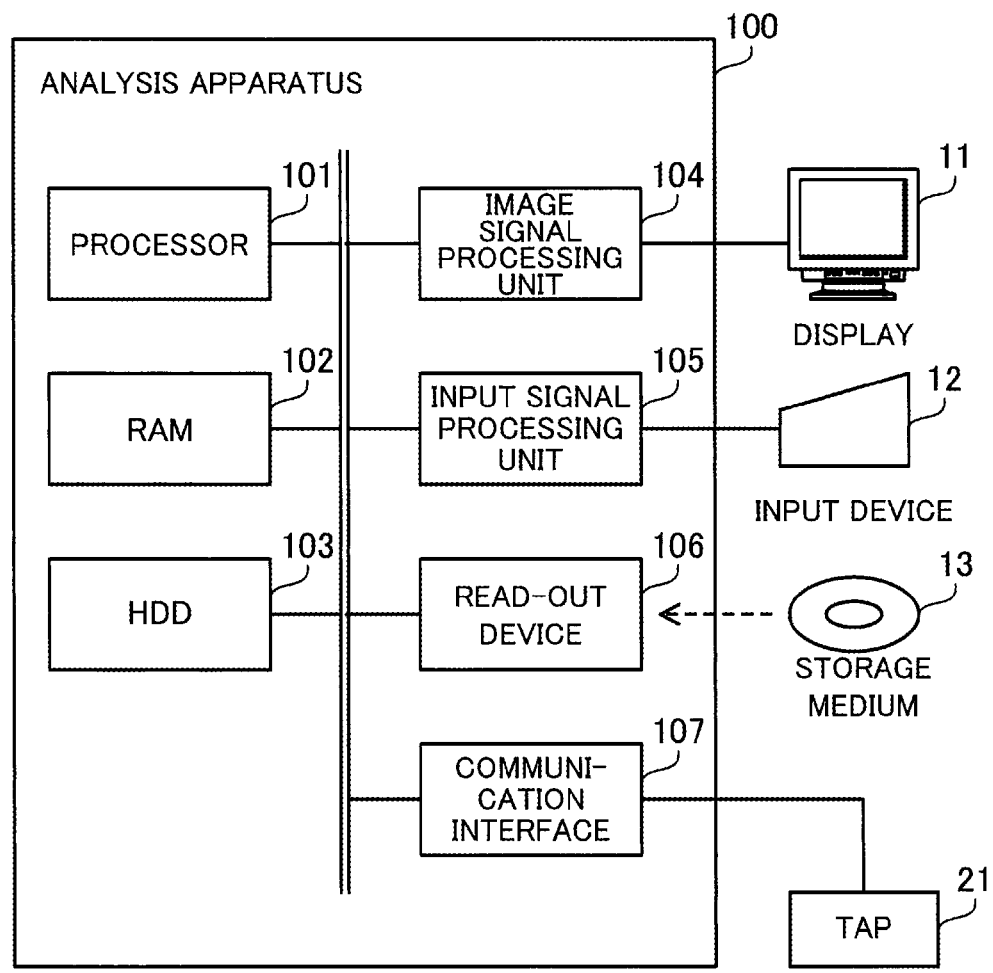
FIG. 3 illustrates a hardware example of an analysis apparatus.

FIG. 3 illustrates a hardware example of the analysis apparatus. The analysis apparatus 100 includes a processor 101, RAM 102, HDD 103, an image signal processing unit 104, an input signal processing unit 105, a read-out device 106, and a communication interface 107. Each of the units is connected to a bus of the analysis apparatus 100.

The processor 101 controls the entire analysis apparatus 100. The processor 101 may be a multi-processor. The processor 101 is CPU, DSP, ASIC, FPGA, or the like, for example. The processor 101 may be a combination of two or more elements from CPU, DSP, ASIC, FPGA, and the like.

RAM 102 is a main storage device of the analysis apparatus 100. RAM 102 temporarily stores at least a part of an OS (Operating System) program and an application program executed by the processor 101. Further, RAM 102 stores various kinds of data used for processing by the processor 101.

HDD 103 is an auxiliary storage device of the analysis apparatus 100. HDD 103 performs data write and read magnetically to and from a built-in magnetic disk. HDD 103 stores the OS program, the application program, and the various kinds of data. The analysis apparatus 100 may include another kind of auxiliary storage device such as a flash memory and SSD (Solid State Drive), and may include a plurality of the auxiliary storage devices.

The image signal processing unit 104 outputs an image to a display 11 connected to the analysis apparatus 100 according to an instruction from the processor 101. As the display 11, various kinds of display may be used such as a CRT (Cathode Ray Tube) display, a liquid crystal display (LCD), and an organic EL (Electro-Luminescence) display.

The input signal processing unit 105 obtains an input signal from an input device 12 connected to the analysis apparatus 100, and outputs it to the processor 101. As the input device 12, various kinds of input device may be used such as a pointing device like a mouse or a touch panel, and a keyboard. A plurality of kinds of input device may be connected to the analysis apparatus 100.

The read-out device 106 reads the program and data stored in a storage medium 13. As the storage medium 13, it is possible to use a magnetic disk such as a flexible disk (FD) and HDD, an optical disk such as CD (Compact disc) and DVD (Digital Versatile Disc), and a magneto-optical disk (MO), for example. Further, as the storage medium 13, also a nonvolatile semiconductor memory may be used such as a flash memory card, for example. The read-out device 106 stores the program and data read out from the storage medium 13 into RAM 102 or HDD 103, according to an instruction from the processor 101, for example.

The communication interface 107 is connected to the tap 21 and receives packets from the tap 21.

Figure 4:
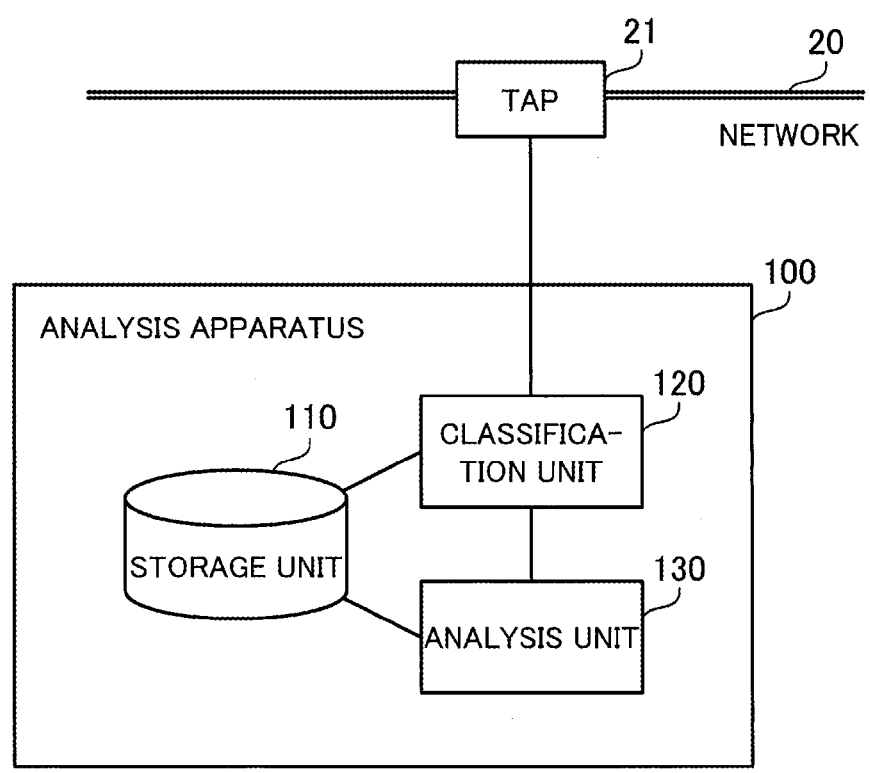
FIG. 4 illustrates a function example of the analysis apparatus.

FIG. 4 illustrates a function example of the analysis apparatus. The analysis apparatus 100 includes a storage unit 110, a classification unit 120, and an analysis unit 130. The storage unit 110 may be realized by the use of a storage area secured in RAM 102 or HDD 103. Each of the classification unit 120 and the analysis unit 130 may be a program module executed by the processor 101.

The storage unit 110 stores packets collected by the classification unit 120. Here, sometimes the packet collection is called "packet capture".

The classification unit 120 receives packets output from the tap 21. In particular, the second embodiment focuses on a data packet transmitted from the server 200 and an ACK packet to the server 200 in response to the data packet.

The classification unit 120 classifies a plurality of packets for each connection. Specifically, packets each having the same combination of source and destination IP addresses (including combination of destination and source IP addresses) in an IP header of the packet and also the same combination of source and destination ports (including combination of destination and source ports) in a TCP header, are classified into the same connection. The classification unit 120 adds reception time information to the classified packet and stores it in the storage unit 110. As the reception time, time managed by the operating system of the analysis apparatus 100 may be added.

The analysis unit 130 analyzes what line type is used by each of the various kinds of terminal apparatus for the communication in the end on the downstream side, according to packet information in each connection when the connection is started.

Here, while, in the following explanation, it is assumed that one ACK packet is transmitted from the terminal apparatus for one data packet transmitted by the server 200, one ACK packet may be transmitted for a plurality of data packets. Also in the case where one ACK packet is transmitted for the plurality of data packets, the function of the analysis apparatus 100 may be applied if it is just determined what order of the data packet is to be focused on among the plurality of packets, for example.

FIGS. 5A to 5C illustrate packet transmission examples for each line type. In the examples of FIGS. 5A to 5C, the bandwidth of the upstream-side wired network connected with the base station 30 and the routers 40 and 50 is assumed to be 100 Mbps (Mega bits per second). The side described as "server side" is assumed to be the upstream side (side of the server 200), and the side described as "terminal side" is assumed to be the downstream side (side of the mobile phone 300 and PCs 400 and 500). Further, the size of one packet is assumed to be 1500 bytes. In FIGS. 5A to 5C, the numbers "1", "2", "3", "4","5", and "6" are attached to the packets transmitted from the server 200 in the order of transmission.

FIG. 5A illustrates a packet flow example on the downstream side of the base station 30 (for the case of HSDPA). While FIG. 5A illustrates both of the packets arrived at the base station 30 and the packets transmitted from the base station 30, the packets having the same number correspond to each other. That is, the base station 30 receives the packet having the number "1" from the server side, and then transmits the received same packet (illustrated as the packet number "1" transmitted to the terminal side) (same in FIGS. 5B and 5C).

In the example of FIG. 5A, the bandwidth available for the packet transmission is narrowed into 2 Mbps due to congestion in the radio channel. The base station 30 transmits packets to the mobile phone 300 using this bandwidth. Because the packets are transmitted to the downstream side with a narrower bandwidth than that on the upstream side, a time needed for serializing one packet (serializing delay) becomes longer than that on the upstream side. The serialization delay is 6.25 milli-seconds (ms), for example.

When the packet loss occurs for the packet transmitted to the terminal side, the base station 30 re-transmits the lost packet. For example, the packet loss occurs for the fourth packet (packet number "4", similar in the following). Then, the base station 30 re-transmits the fourth packet after 10 milli-seconds, which is specified in HSDPA. Similarly, the packet loss occurs for the sixth packet, for example. Then, the base station 30 re-transmits the sixth packet after 10 milli-seconds. If the packet loss occurs again at this time, the base station 30 further re-transmits the sixth packet after 10 milli-seconds. Here, the first, second, third, and fifth packets are received by the mobile phone 300 without re-transmission.

FIG. 5B illustrates a packet flow example on the downstream side of the router 40 (for the case of narrow-band LAN). The bandwidth on the downstream side of the router 40 is 2 Mbps (narrower than that on the upstream side). In this case, the packets are retained in the router 40 due to the serialization delay. The serialization delay of one packet is 6.25 milli-seconds, for example.

FIG. 5C illustrates a packet flow example on the downstream side of the router 50 (for the case of shaping LAN). The bandwidth on the downstream side of the router 50 is 100 Mbps (similar to the case that the bandwidth is narrower on the downstream side than on the upstream side). In this case, the serialization delay is 120 micro-seconds (μsec). The router 50 performs shaping.

The shaping is a bandwidth control technique by the relay apparatus such as the router 50. A token bucket algorithm is used for the shaping. For example, a token (may be called transmission allowable amount) of 2500 bytes is added to the connection (or predetermined flow unit managed in the router 50) every 10 milli-seconds. For example, the router 50 transmits packets to PC 500 as follows.

The router 50 receives the packets having the packet numbers "1" to "6" from the server 200. The router allots the token of 2500 bytes to the data transmission to PC 500. The size of one packet is 1500 bytes. Since the size of one packet is not more than the transmission allowable amount of 2500 bytes which is allotted currently, the router 50 transmits the first packet. The remaining transmission allowable amount is 1000 bytes. The 1000 bytes is smaller than 1500 bytes which is the size of one packet. Accordingly, the router 50 holds the transmission of the second packet until the next and subsequent token allotments.

After that, the router 50 allots the token of 2500 bytes to the data transmission to PC 500. The transmission allowable amount is 3500 bytes including the amount remained in the previous time. Accordingly, the router 50 transmits the second packet and the third packet. The remaining transmission allowable amount becomes 500 bytes. Subsequently, the router 50 transmits the un-transmitted packets sequentially to PC 500 every time the token of 2500 bytes is allotted to the data transmission to PC 500.

As illustrated in FIG. 5A, in the wireless section between the base station 30 and the mobile phone 300, the transmission may vary randomly depending on radio environment at the time, such that the re-transmission occurs, does not occur, or occurs plural times due to the packet loss. Accordingly, the time until the data packet transmitted from the server 200 arrives at the mobile phone 300 may fluctuate randomly for each packet. This implies that RTT may fluctuate randomly also when the bytes-in-flight increases (the increase of the bytes-in-flight and the fluctuation of RTT have a weak correlation or no correlation).

Meanwhile, as illustrated in FIGS. 5B and 5C, the delay in the wired section is mainly caused by the router control such as the serialization and the shaping. Accordingly, as more packets are retained in the router 40 or 50, the time until the packet transmitted from the server 200 arrives at PC 400 or 500 becomes longer. This implies that RTT increases monotonically as the bytes-in-flight increases (the increase of the bytes-in-flight and the increase of RTT have a comparatively strong correlation).

Next, there will be illustrated information of packets collected by the analysis apparatus 100. First, there will be described a case in which the terminal apparatus used by a user is connected to a typical LAN. Here, the typical LAN indicates LAN in which the terminal apparatus and the server 200 communicate with each other in a communication path not including a wireless section and the bandwidth is not narrowed or the shaping is not performed in this communication path. Further, in the following, the packets collected and classified for each connection will be illustrated.

FIG. 6 illustrates a packet table example for the case of typical LAN. A packet table 111 is stored in the storage unit 110. The packet table 111 includes items of No., TIME, SA (Source Address), SP (Source Port), DA (Destination Address), DP (Destination Port), Protocol, TCP LEN (abbreviation of length), IP LEN, seq (abbreviation of sequence), next seq, ACK, RTT, and bytes-in-flight.

The No. item registers a number for identifying a record. The TIME item registers time when the analysis apparatus 100 received the packet. The SA item registers a source IP address. The SP item registers a source port number. The DA item registers a destination IP address. The DP item registers a destination port number.

The Protocol item registers the name of a protocol. The TCP LEN item registers a combined data length of a TCP header and a TCP payload (TCP segment length) (unit is byte). The IP LEN item registers a combined data length of an IP header and an IP payload (IP packet length) (unit is byte).

The seq item registers a sequence number. The sequence number is a serial number attached to a packet. The next seq item registers the sequence number of the next packet. A value set in next seq is the sum of a TCP LEN value and a seq value.

The ACK item registers an ACK number. The ACK number indicates a head byte position of data which is desired to be transmitted next from the opposite apparatus. The ACK number means that data up to a number just previous to the ACK number has been received. The correspondence relationship between the data packet and the ACK packet is determined by the next seq value included in the data packet and the ACK number included in the ACK packet. When an ACK packet is transmitted for a data packet, the next seq value of the data packet and the ACK number of the ACK packet coincide with each other.

The RTT item registers an RTT value (unit is second). RTT is calculated when the ACK packet is received. The bytes-in-flight item registers a bytes-in-flight value at the corresponding time point (unit is byte). The bytes-in-flight is calculated when the data packet is received.

For example, the packet table 111 registers information that No. is "1", TIME is "15:52:05.486593", SA is "IP1", SP is "40952", DA is "IP2", DP is "60401", Protocol is "TCP", TCP LEN is "1448", IP LEN is "1500", seq is "148725083", next seq is "14876531", ACK is "1633673393", RTT is "-" (no setting), and bytes-in-flight is "2896".

This indicates information about the data packet collected at 15:52:05.486593. Here, the IP address "IP1" is the IP address of the server 200. Since this packet is transmitted by the server 200, RTT is not set. Further, it is indicated that the bytes-in-flight at this time point is 2896 bytes.

Further, the packet table 111 registers information that No. is "2", TIME is "15:52:05.486631", SA is "IP2", SP is "60401", DA is "IP1", DP is "40952", Protocol is "TCP", TCP LEN is "0", IP LEN is "52", seq is "1633673393", next seq is "-", ACK is "14876531", RTT is "0.000038", and bytes-in-flight is "-".

This indicates information about the ACK packet collected at 15:52:05.486631. This ACK packet is transmitted by the terminal apparatus side communicating with the server 200, and corresponds to the above data packet of No. "1". The ACK number "14876531" coincides with next seq "14876531" of the data packet of No. "1". RTT at this time may be calculated as a TIME difference between the records "1" and "2", and RTT is 0.000038 seconds.

Figure 7A:
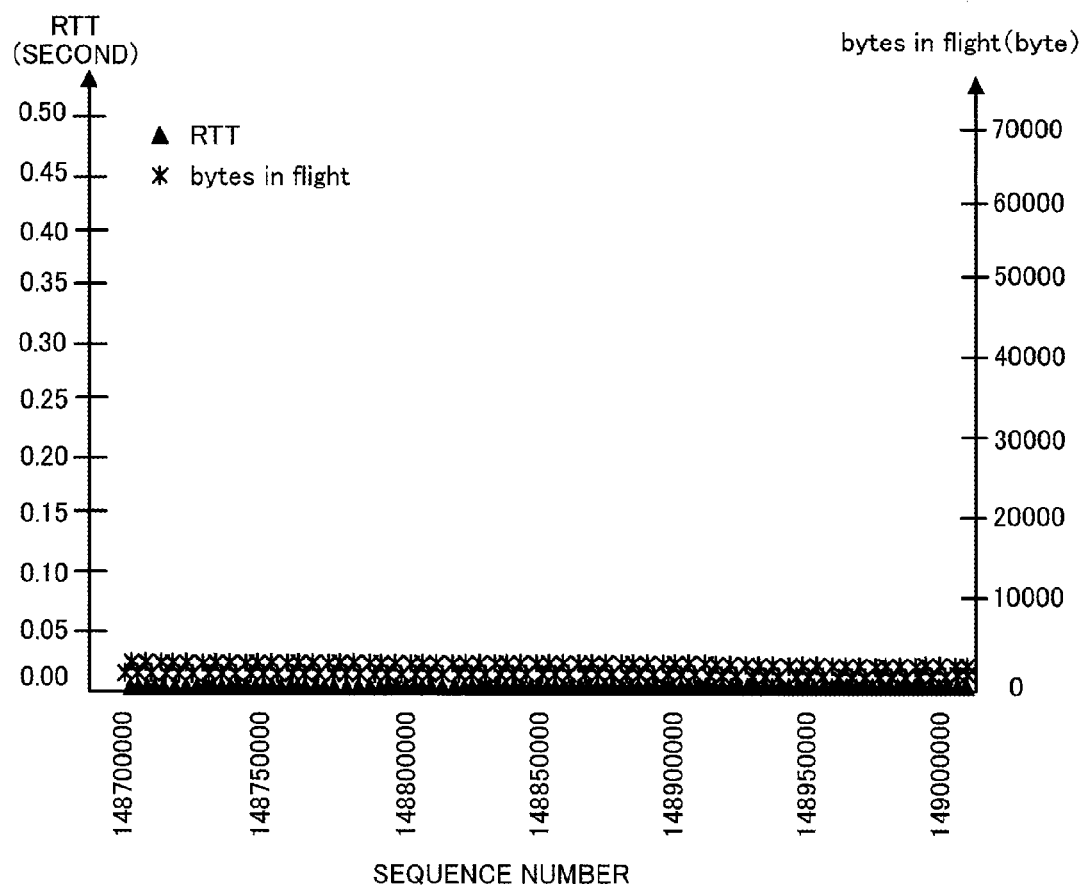
FIGS. 7A and 7B illustrate an RTT measurement result example for the typical LAN.
Figure 7B:
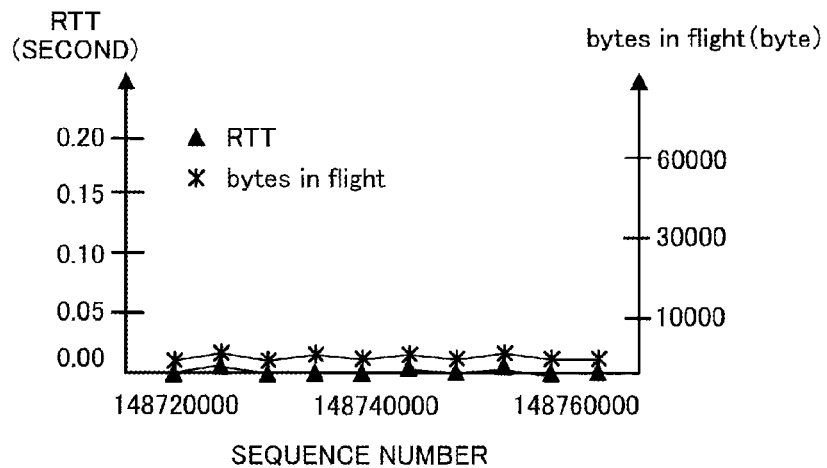

FIGS. 7A and 7B illustrate an RTT measurement result for typical LAN. The horizontal axis in each graph of FIGS. 7A and 7B indicates the sequence number and corresponds to time. A larger sequence number indicates a more distant future, and a smaller sequence number indicates a more remote past. The vertical axes indicate RTT and the byte-in-flight.

FIG. 7A illustrates a measurement result in a given time width, and FIG. 7B illustrates a measurement result in a partial period thereof. With reference to these graphs, the bytes-in-flight and RTT have little increase and decrease in any of the series. It may be considered that this result is obtained because the packet is scarcely retained on the router due to the shaping or the serialization in a typical LAN.

FIG. 8 illustrates a packet table example for HSDPA. A packet table 112 is stored in the storage unit 110. Each item of the packet table 112 is the same as that of the packet table 111, and thus explanation will be omitted.

For example, the packet table 112 registers information that No. is "1", TIME is "04:13:20.611142", SA is "IP1", SP is "80", DA is "IP3", DP is "60628", Protocol is "TCP", TCP LEN is "1460", IP LEN is "1500", seq is "460818496", next seq is "460819956", ACK is "2093475548", RTT is "-", and bytes-in-flight is "7300".

The ACK packet corresponding to the data packet No. "1" transmitted by the server 200 is the ACK packet indicated by the record No. 15. The reason is that the ACK number "46819956" of the ACK packet indicated by No. 15 coincides with the next seq value of the data packet No. "1". RTT measured by the use of these packets is 0.140598 seconds.

Figure 9A:
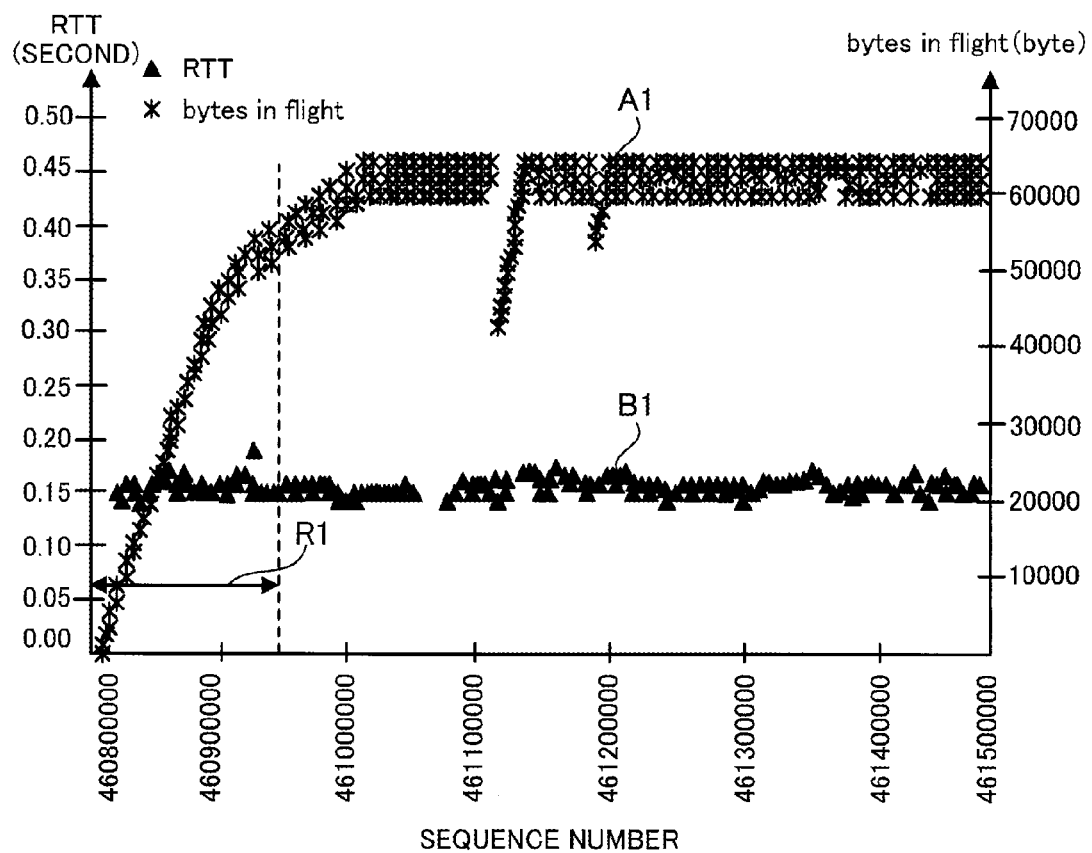
FIGS. 9A and 9B illustrate an RTT measurement result example for HSDPA.
Figure 9B:
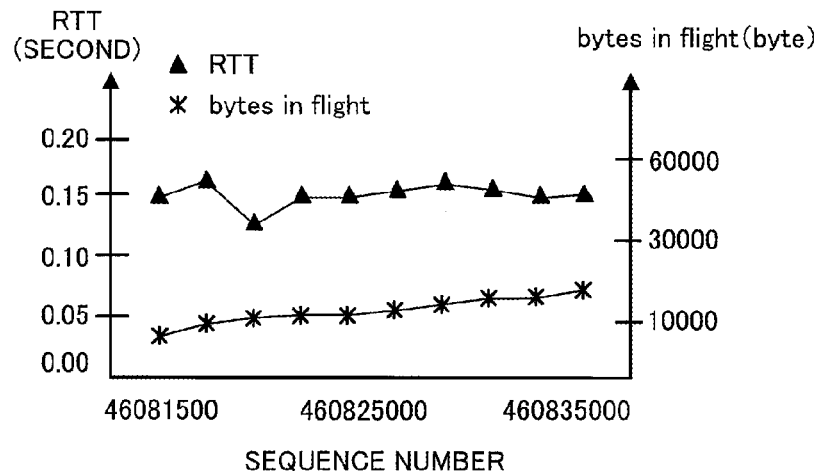

FIGS. 9A and 9B illustrate an RTT measurement result example for HSDPA. The axes in FIGS. 9A and 9B mean the same as those of FIGS. 7A and 7B. FIG. 9A is a measurement result in a given time width. Series A1 indicates the bytes-in-flight. Series B1 indicates RTT. FIG. 9B illustrates a part of series A1 and series B1. With reference to these graphs, it is found that RTT fluctuates randomly in the bytes-in-flight increase period R1.

FIG. 10 illustrates a packet table example for a narrow-band LAN. A packet table 113 is stored in the storage unit 110. The items of the packet table 113 are the same as those of the packet table 111, and thus explanation will be omitted.

For example, the packet table 113 registers information that No. is "1", TIME is "15:53:16.132608", SA is "IP1", SP is "27525", DA is "IP4", DP is "45390", Protocol is "TCP", TCP LEN is "1448", IP LEN is "1500", seq is "2492693045", next seq is "2492694493", ACK is "1886416639", RTT is "-", and bytes-in-flight is "1448".

The ACK packet corresponding to the data packet No. "1" transmitted by the server 200 is the ACK packet indicated by the record No. "9". The reason is that the ACK number "2492694493" of the ACK packet No. "9" coincides with the next seq value of the data packet No. "1". RTT calculated by the use of these packets is 0.000830 seconds.

Figure 11A:
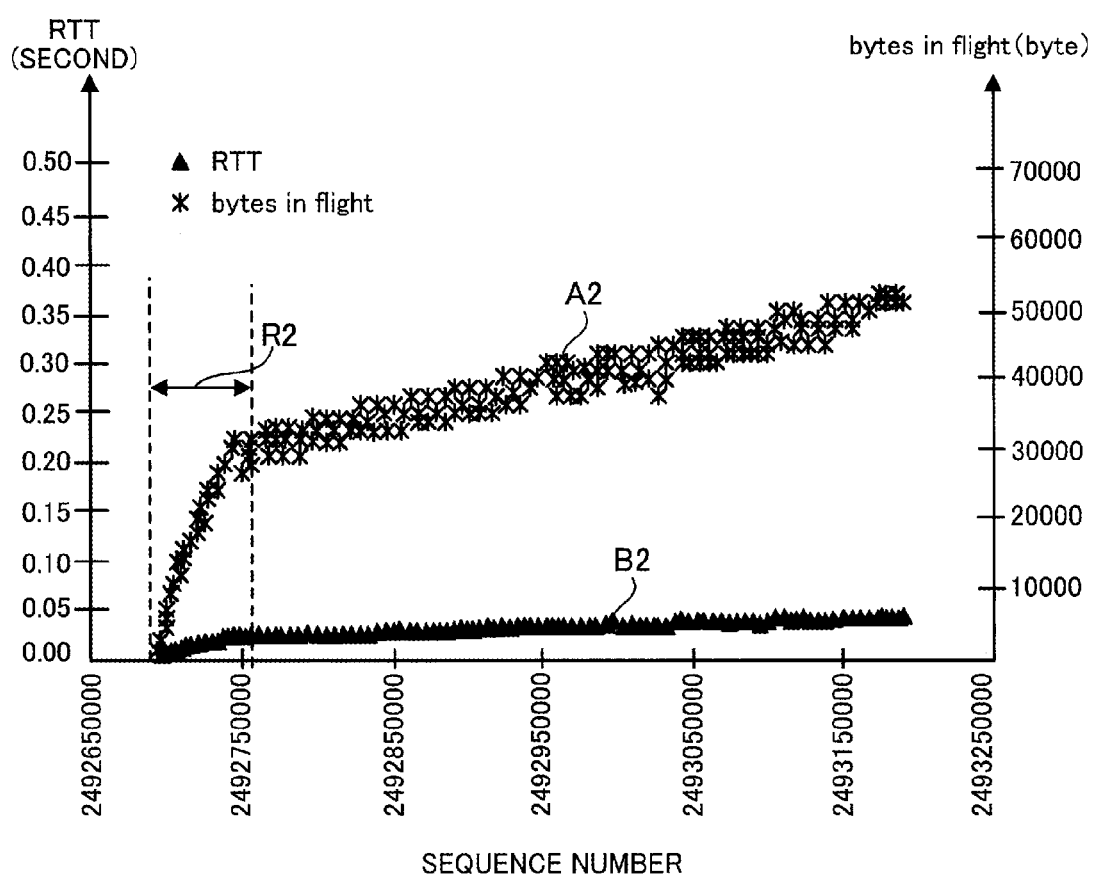
FIGS. 11A and 11B illustrate an RTT measurement result example for the narrow-band LAN.
Figure 11B:
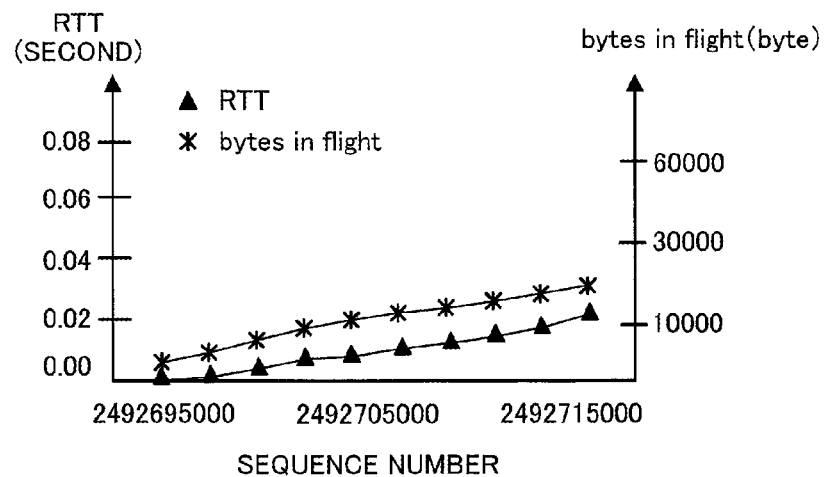

FIGS. 11A and 11B illustrate an RTT measurement result example for a narrow-band LAN. The axes of the graphs in FIGS. 11A and 11B mean the same as those in FIGS. 7A and 7B. FIG. 11A is a measurement result in a given time width. Series A2 indicates the bytes-in-flight. Series B2 indicates RTT. FIG. 11B illustrates a part of series A2 and series B2. With reference to these graphs, it is found that RTT increases monotonically in the bytes-in-flight increase period R2. The monotonic increase of RTT may be considered to reflect the delay due to the serialization.

FIG. 12 illustrates a packet table example for a shaping LAN. A packet table 114 is stored in the storage unit 110. The items of the packet table 114 are the same as those of the packet table 111, and thus explanation will be omitted.

For example, the packet table 114 registers information that No. is "1", TIME is "14:30:35.236636", SA is "IP1", SP is "80", DA is "IP5", DP is "53625", Protocol is "HTTP", TCP LEN is "1460", IP LEN is "1500", seq is "664729235", next seq is "664730695", ACK is "1555774022", RTT is "-", and bytes-in-flight is "2920".

The ACK packet corresponding to the data packet No. "1" transmitted by the server 200 is the ACK packet indicated by the record No. "39". The reason is that the ACK number "664730695" of the ACK packet No. "39" coincides with the next seq value of the data packet No. "1". RTT calculated by the use of these packets is 0.005799 seconds.

Figure 13A:
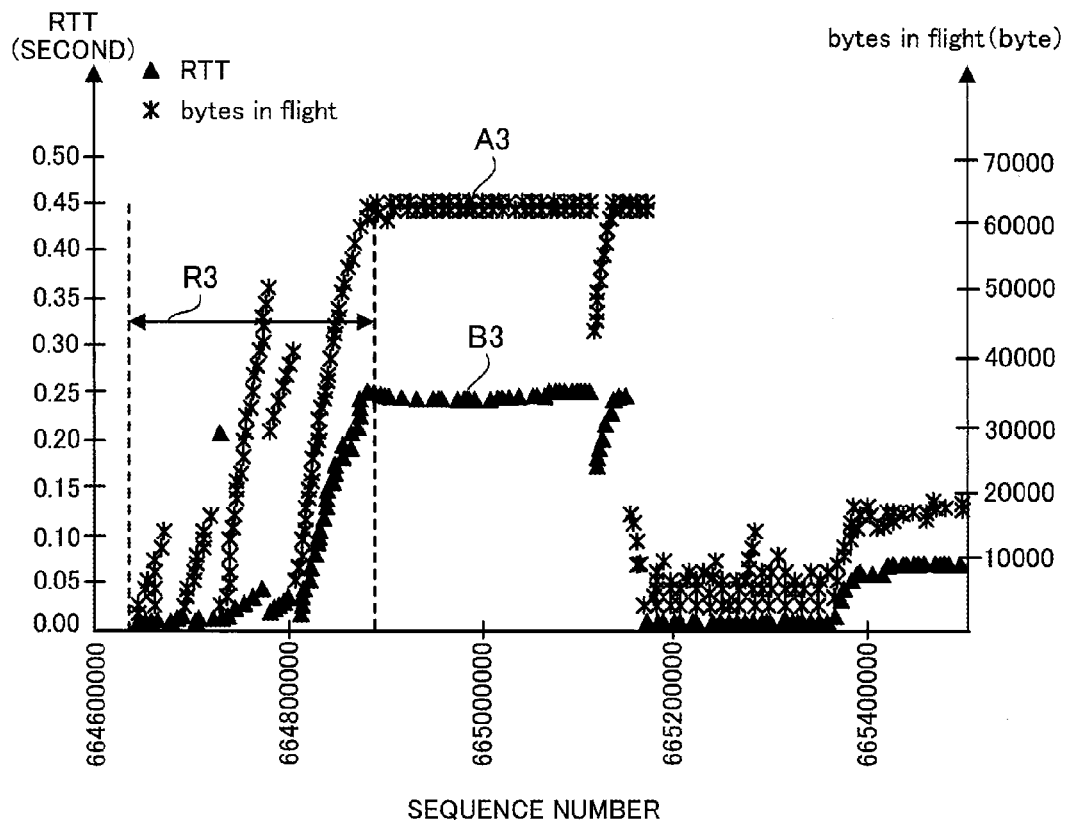
FIGS. 13A and 13B illustrate an RTT measurement result example for the shaping LAN.
Figure 13B:
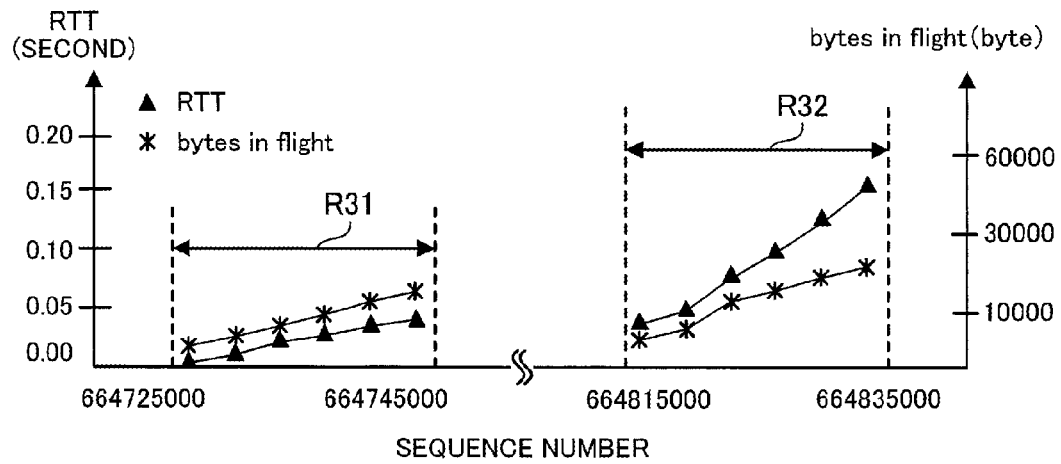

FIGS. 13A and 13B illustrate an RTT measurement result example for a shaping LAN. The axes of the graphs in FIGS. 13A and 13B mean the same as those in FIGS. 7A and 7B. FIG. 13A is a measurement result in a given time width. Series A3 indicates the bytes-in-flight. Series B3 indicates RTT. FIG. 13B illustrates a part of series A3 and series B3. With reference to these graphs, it is found that the bytes-in-flight increase period exists in plurality in the period R3. Further it is found that RTT increases monotonically in each of the bytes-in-flight increase periods. For example, FIG. 13B illustrates the bytes-in-flight increase periods R31 and R32. RTT increases monotonically in each of the bytes-in-flight increase periods R31 and R32.

Here, the bytes-in-flight increase period R31 which is the first half of the period R3 may be considered to express the delay due to the serialization. Meanwhile, the bytes-in-flight increase period R32 which is the second half of the period R3 may be considered to express the delay due to the shaping. The reason is that it may be considered that, in the router, first the delay occurs due to the serialization and then the delay occurs due to the shaping. Further, as illustrated in FIGS. 5A to 5C, generally it is considered that the token allotment interval in the shaping is longer than the time needed for serialization, and an RTT increase amount becomes larger in the delay due to the shaping than in the delay due to the serialization. The RTT increase amount per a unit time is larger in the bytes-in-flight increase period R32 between the bytes-in-flight increase periods R31 and R32. Also from the reason like this, it is determined that the bytes-in-flight increase period R31 expresses the delay due to the serialization and the bytes-in-flight increase period R32 expresses the delay due to the shaping.

FIG. 14 is a flowchart illustrating an example of the packet classification processing. In the following, the processing illustrated in FIG. 14 will be explained along a step number.

(S11) The classification unit 120 receives the copied packet from the tap 21. The packets received by the classification unit 120 include the data packet transmitted by the server 200 and the ACK packet replied to the server 200 in response to the data packet.

(S12) The classification unit 120 determines whether or not the higher level protocol is TCP, with reference to the IP header of the received packet. The higher level protocol is TCP when the setting value of a protocol field in the IP header is "6". In the other cases, the higher level protocol is not TCP. In the case of TCP, the processing proceeds to step S13. If it is not TCP, the processing is terminated.

(S13) The classification unit 120 classifies the packets for each connection, with reference to the IP header in the received packet. As described above, the classification unit 120 classifies the packets having the same combination of the destination and source IP addresses and the same combination of the destination and source ports into the same connection. The classification unit 120 registers information of the packet classified for each connection in the packet table.

(S14) The classification unit 120 registers the packet reception time in association with the packet in the packet table. The classification unit 120 registers also information indicating the packet contents.

(S15) The classification unit 120 calculates the bytes-in-flight or RTT and registers the calculation result in the packet table in association with the reception time registered in step S14. Specifically, the classification unit 120 obtains the bytes-in-flight by calculating a total number of packets for which ACK has not been received in the corresponding connection, at timing when the packet transmitted from the server 200 is received. Further, the classification unit 120 calculates RTT by obtaining a time interval between the reception time of the ACK packet and the reception time of the data packet corresponding to the ACK packet, at timing when the ACK packet transmitted to the server 200 is received.

In this manner, the classification unit 120 repeats the above steps every time receiving the packet, and stores the bytes-in-flight and RTT at the timing of receiving each of the packets into the packet table. The analysis unit 130 determines what line type is used for the communication by each of the terminal apparatuses in the end on the user side, according to the information stored in the packet table.

Figure 15:
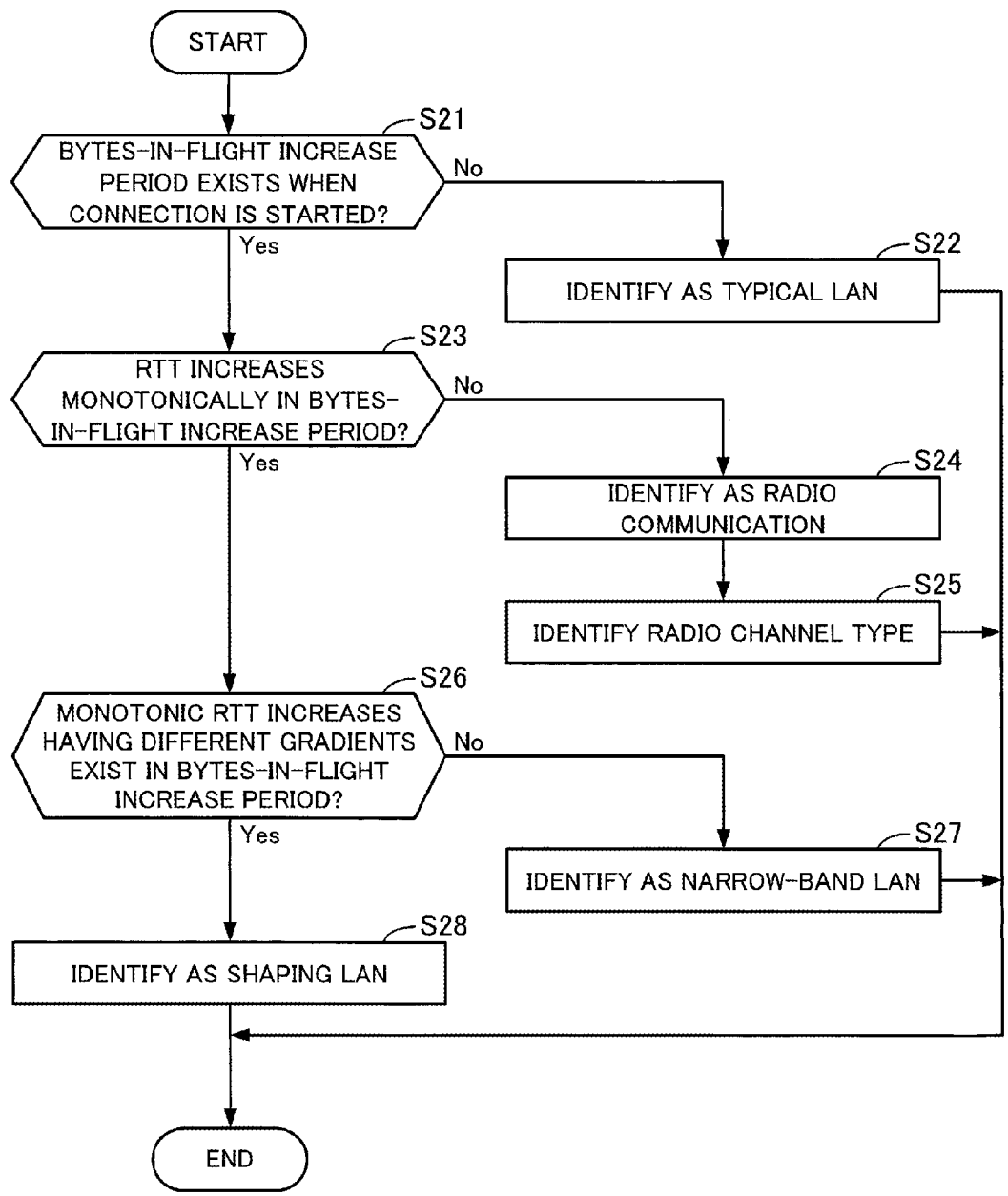
FIG. 15 is a flowchart illustrating an example of line-type determination processing.

FIG. 15 is a flowchart illustrating an example of line type determination processing. In the following, processing illustrated in FIG. 15 will be explained along a step number. The following steps are executed for each connection.

(S21) The analysis unit 130 determines whether or not the bytes-in-flight increase period exists when connection is started, with reference to the packet table. If the bytes-in-flight increase period does not exist, the processing proceeds to step S22. If the bytes-in-flight increase period exists, the processing proceeds to step S23.

(S22) The analysis unit 130 identifies a communication line used by the terminal apparatus in the focused connection to be a typical LAN. The typical LAN has a bandwidth equal to or wider than the bandwidth of the network 20 in the corresponding communication line, differently from a narrow-band LAN. Further, also the shaping may be assumed not to be performed in the typical LAN. The analysis unit 130 stores the identification result for the corresponding connection into the storage unit 110. Then the processing is terminated.

(S23) The analysis unit 130 determines whether or not RTT increases monotonically in the bytes-in-flight increase period. If RTT does not increase monotonically in the bytes-in-flight increase period, the processing proceeds to step S24. If RTT increases monotonically in the bytes-in-flight increase period, the processing proceeds to step S26.

(S24) The analysis unit 130 identifies the communication line used by the terminal apparatus in the focused connection to be a radio channel. The reason why the communication line is the radio channel is as described in FIGS. 9A and 9B.

(S25) The analysis unit 130 determines the type of the radio channel. For example, the period in which the base station or the like re-transmits the data packet is typically specified to have a certain value according to a communication standard. Accordingly, the analysis unit 130 may identify the type of the radio channel by detecting what standard specifies a re-transmission period which matches the RTT delay time. Details will be described below. The analysis unit 130 stores the identification result for the corresponding connection into the storage unit 110. Then, the processing is terminated.

(S26) The analysis unit 130 determines whether or not there exist RTT monotonic increases having different gradients in the bytes-in-flight increase period. If there exist no RTT monotonic increases having the different gradients in the bytes-in-flight increase period, the processing proceeds to step S27. Here, it may be considered that "different" means that the gradient difference is larger than a predetermined threshold value. For example, when there exists a plurality of RTT gradients, if, with respect to a gradient a having appeared initially, an RTT series having a gradient larger than 2a appears, the RTT gradients may be considered to be the "different" gradients.

(S27) The analysis unit 130 identifies the communication line used by the terminal apparatus in the focused connection to be a narrow-band LAN. The analysis unit 130 stores the identification result for the corresponding connection into the storage unit 110. The reason why the communication line may be identified to be the narrow-band LAN is as described in FIGS. 11A and 11B.

(S28) The analysis unit 130 identifies the communication line used by the terminal apparatus in the focused connection to be a shaping LAN. The analysis unit 130 stores the identification result for the corresponding connection into the storage unit 110. The reason why the communication line may be identified to be the shaping LAN is as described in FIGS. 13A and 13B.

In this manner, the analysis apparatus 100 may identify the type of the communication line used at the end of the network on the terminal apparatus side, by determining whether or not RTT increases monotonically in the bytes-in-flight increase period. Here, the analysis unit 130 may analyze the information being stored into the packet table in real time, or may perform the above analysis with reference to the packet table at predetermined timing (timing when the record is accumulated to some extent into the packet table).

Further, in step S26, it is conceivable to distinguish the narrow-band LAN and the shaping LAN by another method. For example, since the delay time due to the serialization varies according to the packet size in the narrow-band LAN, RTT may be considered to vary also according to the packet size. Meanwhile, the main delay factor in the shaping LAN is token allotment waiting, and the influence of the packet size to RTT may be considered to be smaller than in the narrow-band LAN.

Accordingly, the analysis unit 130 may identify that the terminal apparatus uses a narrow-band LAN, when the packets have different sizes and RTT varies according to the packet size in the focused connection. Meanwhile, the analysis unit 130 may identify that the terminal apparatus uses a shaping LAN when the packets have different sizes and RTT does not vary according to the packet size in the focused connection.

Alternatively, there is also a case in which shaping information of the router 50 or the like is known preliminarily (e.g., all the toke allotment intervals are 10 milli-seconds in the shaping of a router introduced by some corporation). The RTT increase amount may be considered to depend on the token allotment interval. Accordingly, when the RTT increase amount depending on the token allotment interval is found in the focused connection, the terminal apparatus may be identified to be connected to the shaping LAN in the corresponding connection. Next, there will be specifically explained a method of determining the radio communication channel type in step S25.

FIG. 16 illustrates an example of a radio channel type determination method. While the packet communication is performed between the server and the mobile phone 300, the analysis apparatus 100 is also illustrated in a sequence chart of FIG. 16 so as to facilitate understanding of a time when the analysis apparatus 100 collects the packets.

For example, it is assumed that a series of communication is performed as follows. The server 200 transmits a data packet to the mobile phone 300. The analysis apparatus 100 receives the data packet at time t1. The mobile phone 300 receives the data packet via the base station 30 (step ST101).

The mobile phone 300 transmits an ACK packet to the server 200 via the base station 30. The analysis apparatus 100 receives the ACK packet at time t2. The server 200 receives the ACK packet (step ST102).

The server 200 transmits the next data packet to the mobile phone 300. The analysis apparatus 100 receives the data packet at time t3. Packet loss occurs in the wireless section between the base station 30 and the mobile phone 300 (step ST103).

The base station 30 re-transmits the data packet which has not been transmitted in step ST103, in a predetermined period according to a radio communication standard. The mobile phone 300 receives the re-transmitted data packet (step ST104).

The mobile phone 300 transmits an ACK packet to the server 200 via the base station 30. The analysis apparatus 100 receives the ACK packet at time t4. The server 200 receives the ACK packet (step ST105).

Here, it is assumed that the data interval Td=t3−t1, the ACK interval Ta=t4−t2, the delay time $\Delta T$ =Ta−Td, and the re-transmission period specified by the radio communication standard is Ts. Here, the ACK interval Ta indicates a time difference between the reception time (at the analysis apparatus 100) of the focused ACK packet (ACK packet in step ST 105) and the reception time of the just previous ACK packet (ACK packet in step ST102). The data interval Td indicates a reception interval of the two data packets corresponding to the two ACK packets from which the ACK interval is calculated. Then, it is conceivable that in step ST25, the analysis unit 130 performs processing as follows for an ACK packet pair and a data packet pair in which $\Delta T > 0$.

The analysis unit 130 determines whether or not the delay time $\Delta T$ coincides with a preliminarily known radio re-transmission period (e.g., 10 milli-seconds in HSDPA and 8 milli-seconds in LTE). For example, the delay time $\Delta T$ is determined to coincide with the re-transmission period of HSDPA if the delay time $\Delta T$ is in a range of 10 (milli-seconds) X N±2 (milli-seconds) (N is an integer not smaller than 1) (if $10N-2 \leq \Delta T \leq 10N+2$ (milli-seconds)), and is determined not to coincide with the re-transmission period of HSDPA if the delay time $\Delta T$ is not included in the range. In this manner, the determination of the coincidence may be performed including an error of a predetermined rate (e.g., 20%). For LTE, if $8N-1.6 \leq \Delta T \leq 8N+1.6$ (milli-seconds), for example, the delay time $\Delta T$ is determined to coincide with the radio re-transmission period of LTE, and, otherwise, is determined not to coincide with the radio re-transmission period of LTE.

The analysis unit 130 performs the determination using $\Delta T$ and the radio re-transmission period for the various ACK packet pairs and data packet pairs for each connection. For example, the analysis unit 130 determines that the radio channel used by the mobile phone 300 is HSDPA if a ratio of the determinations in which the delay time $\Delta T$ is determined to coincide with the re-transmission period of 10 milli-seconds is not less than a predetermined ratio (e.g., 80%) of the determinations performed for the corresponding connection. This is the same for LTE.

When this determination result indicates that there is a possibility that the radio channel corresponds to both HSDPA and LTE, the analysis unit 130 specifies which radio re-transmission period has a larger ratio in the coincidence determination (10 milli-seconds or 8 milli-seconds). Then, it is conceivable that the radio channel type corresponding to the specified radio re-transmission period is determined to be the final identification result. In this manner, the analysis apparatus 100 may identify the radio channel type used by the mobile phone 300.

Meanwhile, it is conceivable to collect the packets in the wired section to which the server 200 is connected (upstream side), as the information processing system in the second embodiment. This is because the packets which are transmitted and received between the server 200 and the various terminal apparatuses may be collected efficiently by the use of a smaller number of collection points than on the downstream side.

In this case, the collected packets are not always limited only to the packets of the communication including the wireless section in the communication path. For example, when the server 200 provides service for many and unspecified terminal apparatuses, the collected packets may include the packets of the communication not including the wireless section in the communication path between the server 200 and the terminal apparatus. In the second embodiment, the analysis apparatus 100 also collects the packets including the packets of the communication between PCs 400 and 500 and the server 200 in a mixed manner.

It is difficult for the analysis apparatus 100 to know preliminarily what lines are used by many and unspecified terminal apparatuses for the communication with the server 200. In this case, for example, it is conceivable to determine the radio channel type on the basis of the periodicity of the re-transmission in the radio channel by the use of the delay time ΔT as explained in FIG. 16. Only by this method, however, there is a possibility that the analysis includes also the packets of the communication not including the wireless section in a mixed manner.

Figure 17A:
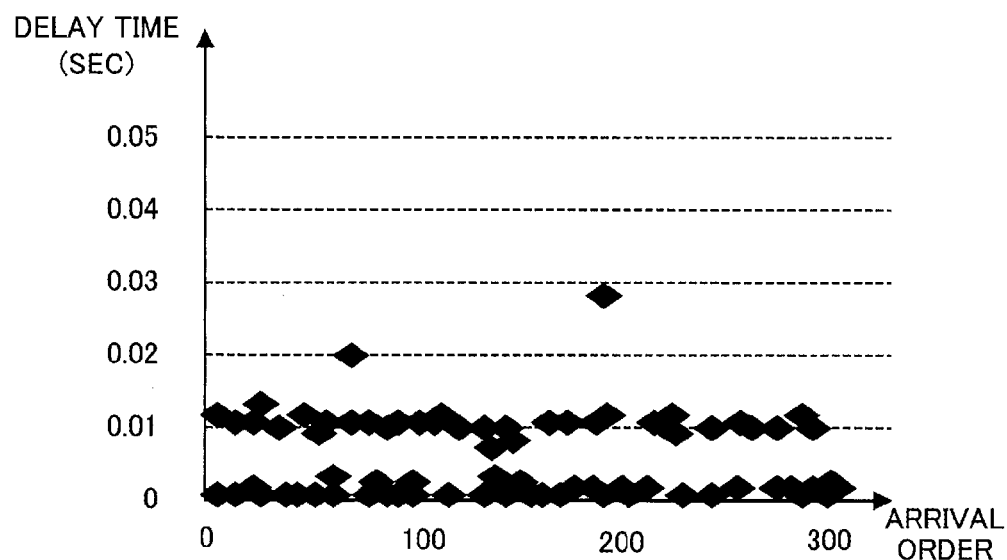
FIGS. 17A and 17B illustrate examples of a delay time by re-transmission when a wireless section is HSDPA.
Figure 17B:
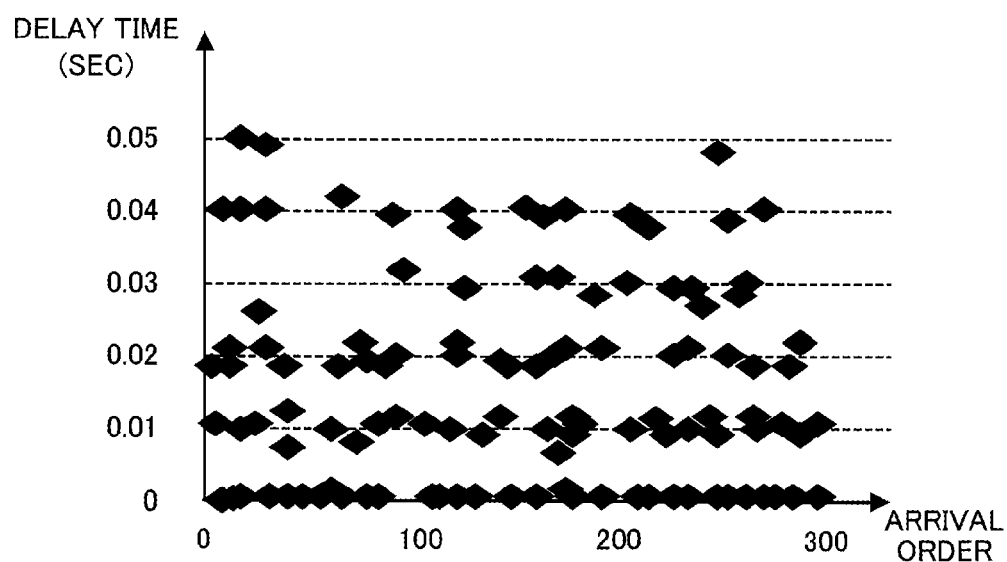
Figure 18A:
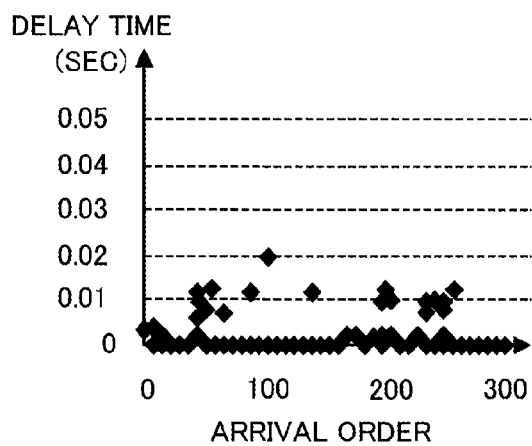
FIGS. 18A to 18F illustrate examples of applying delay time calculation to communication not including a wireless section.
Figure 18B:
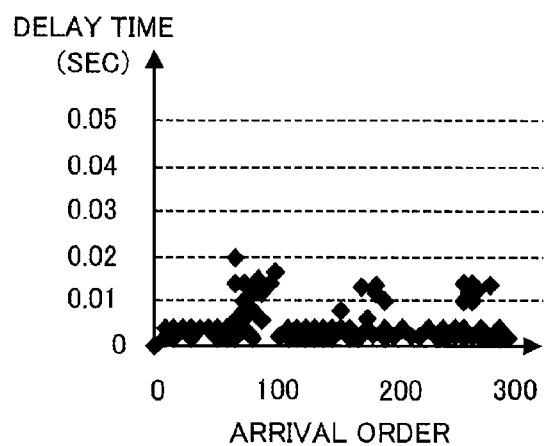
Figure 18C:
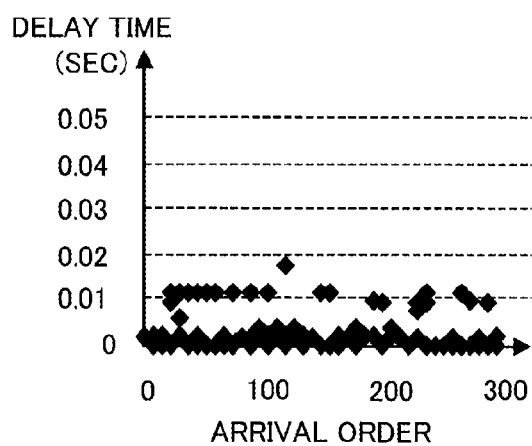
Figure 18D:
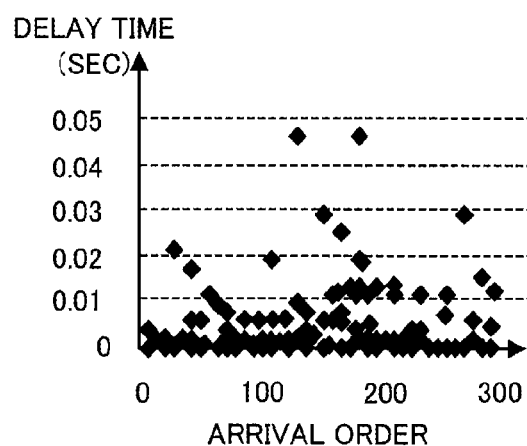
Figure 18E:
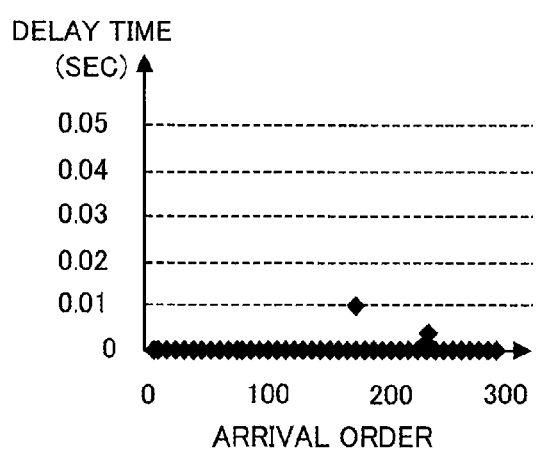
Figure 18F:
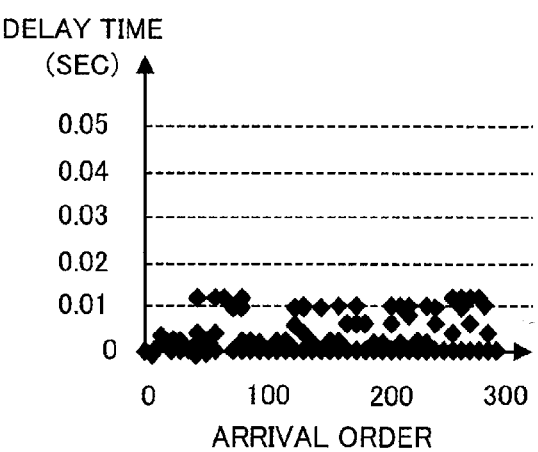

FIGS. 17A and 17B illustrate examples of the delay time due to re-transmission when the wireless section is HSDPA. Either one of FIGS. 17A and 17B is a calculation result of the delay time ΔT when the mobile phone 300 communicates with the base station 30 using HSDPA. While the delay time ΔT is different depending on measurement timing, it is found that any of the delay times ΔT approximates N times of the re-transmission period.

FIGS. 18A to 18F illustrate examples of applying the delay time calculation to the communication not including the wireless section. The calculation method of the delay time ΔT used here is the same as the method explained in FIG. 16. Any of FIGS. 18A to 18F is a result of applying the calculation of the delay time ΔT to the communication not including the wireless section. In this manner, also for the communication not including the wireless section, there is a possibility that the delay time ΔT is plotted near N times of 10 milli-seconds. Then, only by the simple comparison of the delay time ΔT with the radio re-transmission period, the packet of the communication not including the wireless section is mixed in the calculation, and it is not easy to perform the analysis limited to the communication including the wireless section.

Therefore, it becomes a problem how to select the packet of the communication including the wireless section (i.e., packets of the communication between the server 200 and the mobile phone 300) from the collected packets.

Accordingly, the analysis apparatus 100 determines the packets corresponding to the connection in which RTT does not increase monotonically in the bytes-in-flight increase period to be the packets of the communication between the server 200 and the mobile phone 300. Thereby, the analysis apparatus 100 may select the packets of the communication including the wireless section from among the packets collected in the network 20. The reason is that, in the case of the communication not including the wireless section (communication between the server 200 and PC 400 or 500), RTT tends to increase monotonically as the bytes-in-flight increases, as explained in FIGS. 11A and 11B and FIGS. 13A and 13B.

By identifying the communication including the wireless section in this manner, it is possible to appropriately perform cause isolation of communication quality degradation in the information processing system (e.g., estimation like the communication delay is caused by the wireless section). Further, by identifying the radio channel type, it becomes possible to take measures for quality improvement depending on the radio channel type.

Further, according to the analysis apparatus 100, it is possible to estimate which line type is connected with the terminal apparatus among the typical LAN, narrow-band LAN, and shaping LAN, also for the communication not including the wireless section. Accordingly, it is possible to appropriately perform the cause isolation in the communication quality degradation (estimation like the bandwidth becomes narrow in the network on the user terminal side, and the shaping is performed) also for the communication not including the wireless section.

Note that the information processing of the first embodiment may be realized by means of causing a processor used as the operation unit 1b to execute a program. The information processing of the second embodiment may be realized by means of causing the processor 101 to execute a program. The programs may be stored in the computer-readable storage medium 13.

For example, the program may be circulated by means of distributing the storage medium 13 storing the program. Further, the program may be stored in another computer and the program may be distributed via a network. The computer may store (install) the program stored in the storage medium 13 or the program received from another computer, for example, into a storage device such as RAM 102 and HDD 103 and may read the program from the storage device for execution.

In one aspect, it is possible to identify the packet of the communication including the wireless section.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A non-transitory computer-readable storage medium storing a computer program that causes a computer to perform a process comprising:

collecting packets in a wired section of a network, and classifying the packets by connection, the packets being transmitted by an information processing apparatus connected to the wired section;

determining a connection having a period in which a total data amount of packets whose corresponding confirmation response packets have not arrived from a destination apparatus increases, the period beginning when the connection is started; and identifying that a wireless section is included in a communication path between the destination apparatus and the information processing apparatus in the network when round-trip times of packets of the determined connection do not increase monotonically in the period.

2. The non-transitory computer-readable storage medium according to claim 1, wherein the process further includes:
determining, when the round-trip times increase monotonically in the period, that another wired section having a narrower bandwidth than the wired section exists in the communication path.

3. The non-transitory computer-readable storage medium according to claim 1, wherein the period includes sub-periods in each of which the total data amount increases; and
wherein the process further includes determining that shaping is performed by a relay apparatus in the communication path, when the round-trip times increase monotonically with different gradients in each of the sub-periods.

4. The non-transitory computer-readable storage medium according to claim 1, wherein the process further includes:
determining another connection in the network, said another connection not having the period; and
determining that a bandwidth equal to or wider than a bandwidth of the wired section is used in all sections of a communication path, corresponding to said another connection, between the information processing apparatus and another destination apparatus.

5. The non-transitory computer-readable storage medium according to claim 1, the process further includes:
calculating a first time interval between reception times of two sequentially-received confirmation response packets among a plurality of confirmation response packets of the communication path including the wireless section, and a second time interval between reception times of two data packets corresponding to the two sequentially-received confirmation response packets, and determining a channel type of the wireless section according to a comparison of a difference between the first and second time intervals, with a re-transmission period of a radio communication standard.

6. A packet analysis apparatus, comprising:
a memory configured to store a plurality of packets collected in a wired section of a network, the plurality of packets being transmitted by an information processing apparatus connected to the wired section; and
a processor configured to perform a process including:
classifying the plurality of packets stored in the memory by connection;
determining a connection having a period in which a total data amount of packets whose corresponding confirmation response packets have not arrived from a destination apparatus increases, the period beginning when the connection is started; and
identifying that a wireless section is included in a communication path between the destination apparatus and the information processing apparatus in the network when round-trip times of packets of the determined connection do not increase monotonically in the period.

7. A packet analysis method, comprising:
collecting, by a processor, packets in a wired section of a network, and classifying the packets by connection, the packets being transmitted by an information processing apparatus connected to the wired section;
determining, by the processor, a connection having a period in which a total data amount of packets whose corresponding confirmation response packets have not arrived from a destination apparatus increases, the period beginning when the connection is started; and
identifying, by the processor, that a wireless section is included in a communication path between the destination apparatus and the information processing apparatus in the network when round-trip times of packets of the determined connection do not increase monotonically in the period.

* * * * *